«12» United States Patent
Salsbury et al.

(10) Patent No.: US 10,558,177 B2
(45) Date of Patent: Feb. 11, 2020

(54) CONTROL SYSTEM WITH DIMENSION REDUCTION FOR MULTIVARIABLE OPTIMIZATION

(71) Applicant: Johnson Controls Technology Company, Plymouth, MI (US)

(72) Inventors: Timothy I. Salsbury, Mequon, WI (US); Carlos Felipe Alcala Perez, Milwaukee, WI (US); John M. House, Saint-Leonard (CA)

(73) Assignee: Johnson Controls Technology Company, Auburn Hills, MI (US)

( * ) Notice: Subject to any disclaimer, the term of this patent is extended or adjusted under 35 U.S.C. 154(b) by 143 days.

(21) Appl. No.: 15/476,465

(22) Filed: Mar. 31, 2017

(65) Prior Publication Data

US 2018/0284701 A1  Oct. 4, 2018

(51) Int. Cl.
*G05B 13/02* (2006.01)
*F24F 11/30* (2018.01)
*F24F 11/62* (2018.01)
*F24F 11/52* (2018.01)
*F24F 11/65* (2018.01)

(52) U.S. Cl.
CPC ............ *G05B 13/021* (2013.01); *F24F 11/30* (2018.01); *F24F 11/62* (2018.01); *F24F 11/52* (2018.01); *F24F 11/65* (2018.01)

(58) Field of Classification Search
CPC .. F24F 11/30; F24F 11/62; F24F 11/52; F24F 11/65
See application file for complete search history.

(56) References Cited

U.S. PATENT DOCUMENTS 7,827,813 B2   11/2010  Seem
8,027,742 B2    9/2011  Seem et al.
8,200,344 B2    6/2012  Li et al.
(Continued)

OTHER PUBLICATIONS

Camacho et al. Self-Tuning Run to Run Optimization of Fed-Batch Processes Using Unfold-PLS, 2007, Wiley InterScience, pp. 1789-1804 (Year: 2007).*
(Continued)

*Primary Examiner* — Mohammad Ali
*Assistant Examiner* — Vincent W Chang
(74) *Attorney, Agent, or Firm* — Foley & Lardner LLP

(57) ABSTRACT

A control system is configured to operate a multiple-input system to achieve an optimal value for a performance variable of the multiple-input system. The control system includes a mapper configured to generate a mapping from a first number of manipulated variables to a second number of latent variables. The second number is smaller than the first number and each of the latent variables includes a linear combination of the manipulated variables. The control system also includes an extremum-seeking controller configured to receive the performance variable from the multiple-input system as a feedback and modulate values of the second number of latent variables to drive the performance variable to the optimal value. The mapper is further configured to use the mapping to translate modulated values of the second number of latent variables to modulated values of the first number of manipulated variables and provide the modulated values of the first number of manipulated variables to the multiple-input system.

20 Claims, 12 Drawing Sheets

(56) References Cited

U.S. PATENT DOCUMENTS

| | | | |
|---|---|---|---|
| 8,200,345 B2 | 6/2012 | Li et al. | |
| 8,473,080 B2 | 6/2013 | Seem et al. | |
| 2009/0287320 A1* | 11/2009 | MacGregor | G05B 17/02 |
| | | | 700/29 |
| 2015/0153476 A1* | 6/2015 | Prange | E21B 43/00 |
| | | | 703/2 |
| 2016/0043526 A1* | 2/2016 | Kutz | H01S 3/1115 |
| | | | 700/90 |
| 2016/0098020 A1 | 4/2016 | Salsbury et al. | |
| 2016/0132027 A1 | 5/2016 | Li et al. | |
| 2018/0041184 A1* | 2/2018 | Broyde | H04B 1/40 |

OTHER PUBLICATIONS

U.S. Appl. No. 14/495,773, filed Sep. 24, 2014, Johnson Controls Technology Company.
U.S. Appl. No. 14/975,527, filed Dec. 18, 2015, Johnson Controls Technology Company.
U.S. Appl. No. 15/080,435, filed Mar. 24, 2016, Johnson Controls Technology Company.
U.S. Appl. No. 15/232,800, filed Aug. 9, 2016, Johnson Controls Technology Company.
U.S. Appl. No. 15/284,468, filed Oct. 3, 2016, Johnson Controls Technology Company.

* cited by examiner

CONTROL SYSTEM WITH DIMENSION REDUCTION FOR MULTIVARIABLE OPTIMIZATION

BACKGROUND

The present disclosure relates generally to systems and methods for dimension reduction for multivariable extremum-seeking optimization. Extremum-seeking optimization is a class of self-optimizing control strategies that can dynamically search for the unknown and/or time-varying inputs of a system for optimizing a certain performance index. Modern systems often have a myriad of inputs that can be manipulated in order to optimize the performance index. Control techniques that manipulate many variables simultaneously can offer superior performance over those that divide a system into separate single variable control loops. Because complexity and computational load may increase exponentially with the number of manipulated variables, a subset of variables p is chosen from the total possible number n of variables (p<n) in setting up the multivariable control or optimization. Conventional approaches for selecting the subset of variables p range from rules of thumb to detailed system identification experiments. Generally, the conventional approaches involve making a binary decision for each possible variable as to whether to include the variable in the control or optimization. Thresholds of some sort are thus needed in order to make the binary decisions on variable inclusion, which can be difficult to determine. A more applicable approach for reducing the dimensionality of a control or optimization problems is therefore desired.

SUMMARY

One implementation of the present disclosure is a control system configured to operate a multiple-input system to achieve an optimal value for a performance variable of the multiple-input system. The control system includes a mapper configured to generate a mapping from a first number of manipulated variables to a second number of latent variables. The second number is smaller than the first number and each of the latent variables includes a linear combination of the manipulated variables. The control system also includes an extremum-seeking controller configured to receive the performance variable from the multiple-input system as a feedback and modulate values of the second number of latent variables to drive the performance variable to the optimal value. The mapper is further configured to use the mapping to translate modulated values of the second number of latent variables to modulated values of the first number of manipulated variables and provide the modulated values of the first number of manipulated variables to the multiple-input system.

In some embodiments, the mapper is configured to generate the mapping from the first number of manipulated variables to the second number of latent variables using a principle component analysis (PCA) process.

In some embodiments, the mapper is configured to generate the mapping from the first number of manipulated variables to the second number of latent variables using a partial least squares (PLS) process.

In some embodiments, the mapper is configured to generate the mapping from the first number of manipulated variables to the second number of latent variables using a canonical correlation analysis (CCA) process.

In some embodiments, the extremum-seeking controller includes a multivariable extremum-seeking controller configured to determine optimal values for all the latent variables.

In some embodiments, the extremum-seeking controller includes a plurality of single-variable extremum-seeking controllers each assigned to a different latent variable and configured to determine an optimal value for the assigned latent variable.

In some embodiments, the extremum-seeking controller includes a hybrid extremum-seeking controller configured to operate in multiple different operating modes for determining optimal values for the latent variables.

Another implementation of the present disclosure is a method for operating a multiple-input system to achieve an optimal value for a performance variable of the multiple-input system. The method includes generating a mapping from a first number of manipulated variables to a second number of latent variables. The second number is smaller than the first number and each of the latent variables includes a linear combination of the manipulated variables. The method also includes receiving the performance variable from the multiple-input system as a feedback and modulating values of the second number of latent variables to drive the performance variable to the optimal value. The method further includes using the mapping to translate modulated values of the second number of latent variables to modulated values of the first number of manipulated variables and providing the modulated values of the first number of manipulated variables to the multiple-input system.

In some embodiments, generating the mapping from the first number of manipulated variables to the second number of latent variables includes using a principle component analysis (PCA) process to generate the mapping.

In some embodiments, generating the mapping from the first number of manipulated variables to the second number of latent variables includes using a partial least squares (PLS) process to generate the mapping.

In some embodiments, generating the mapping from the first number of manipulated variables to the second number of latent variables includes using a canonical correlation analysis (CCA) process to generate the mapping.

In some embodiments, modulating values of the second number of latent variables to drive the performance variable to the optimal value includes using a multivariable extremum-seeking controller to determine optimal values for all the latent variables.

In some embodiments, modulating values of the second number of latent variables to drive the performance variable to the optimal value includes using a plurality of single-variable extremum-seeking controllers each assigned to a different latent variable to determine an optimal value for the assigned latent variable.

In some embodiments, modulating values of the second number of latent variables to drive the performance variable to the optimal value includes using a hybrid extremum-seeking controller to operate in multiple different operating modes for determining optimal values for the latent variables.

Another implementation of the present disclosure is a mapping system for dimension reduction for multivariable extremum-seeking optimization. The mapping system includes a mapper in communication with an extremum-seeking controller and a multiple-input system controlled by the extremum-seeking controller. The mapper is configured to generate excitations to a first number of manipulated variables. The first number of manipulated variables are capable of influencing a performance variable of the multiple-input system. The mapper is also configured to generate a mapping from the first number of manipulated variables to a second number of latent variables. The second number is smaller than the first number and each of the latent variables includes a linear combination of the manipulated variables. The mapper is further configured to provide the second number to the extremum-seeking controller where values of the second number of latent variables are modulated to drive the performance variable to the optimal value, to use the mapping to translate modulated values of the second number of latent variables to modulated values of the first number of manipulated variables, and to provide the modulated values of the first number of manipulated variables to the multiple-input system.

In some embodiments, generating the mapping from the first number of manipulated variables to the second number of latent variables includes receiving values of the first number of manipulated variables corresponding to the excitations from the multiple-input system, calculating a variance matrix for the values of the first number of manipulated variables corresponding to the excitations, calculating eigenvalues and eigenvectors of the variance matrix, determining the second number of latent variables using the eigenvalues, and generating the mapping from the first number of manipulated variables to the second number of latent variables using the eigenvectors.

In some embodiments, determining the second number of latent variables includes selecting the second number of eigenvalues with a sum greater than a threshold value, and generating the mapping from the first number of manipulated variables to the second number of latent variables comprises using the second number of eigenvectors corresponding to the selected eigenvalues to form the mapping.

In some embodiments, generating the mapping from the first number of manipulated variables to the second number of latent variables includes receiving values of the first number of manipulated variables and the performance variable corresponding to the excitations from the multiple-input system, calculating a covariance matrix for the values of the first number of manipulated variables and the performance variable corresponding to the excitations, calculating eigenvalues and eigenvectors of the covariance matrix, calculating a prediction error, determining whether to continue regression using the prediction error, and in response to determining not to continue regression, determining the second number of latent variables.

In some embodiments, determining the second number of latent variables further includes in response to determining to continue regression, calculating residuals for the values of the first number of manipulated variables and the performance variable corresponding to the excitations, and using the residuals to calculate the covariance matrix, the eigenvalues and eigenvectors of the covariance matrix, and the prediction error, and to determine whether to continue regression.

In some embodiments, generating the mapping from the first number of manipulated variables to the second number of latent variables includes receiving values of the first number of manipulated variables and the performance variable corresponding to the excitations from the multiple-input system, scaling values of the first number of manipulated variables and the performance variable to zero mean, calculating a covariance matrix using the scaled values of the first number of manipulated variables and the performance variable, calculating eigenvalues and eigenvectors using the covariance matrix, determining the number of latent variables using the eigenvalues, and generating the mapping from the first number of manipulated variables to the second number of latent variables using the eigenvectors.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Figure 1:
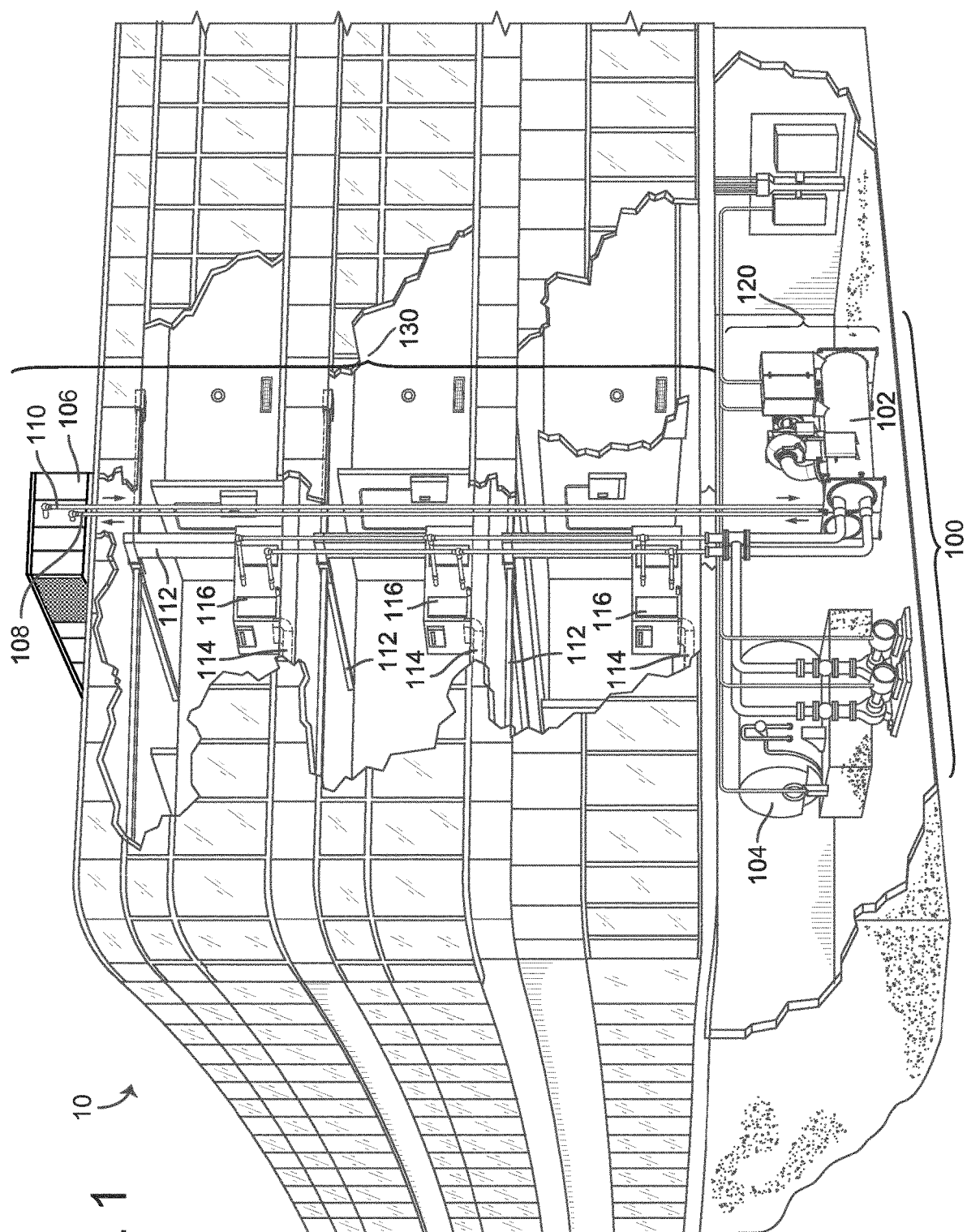
FIG. 1 is a drawing of a building having a heating, ventilating, and air-conditioning (HVAC) system in which a technique of dimension reduction for multivariable extremum-seeking optimization can be implemented, according to some embodiments.

Referring generally to the FIGURES, various systems and methods for dimension reduction for multivariable extremum-seeking optimization are shown, according to some embodiments. In general, extremum-seeking optimization is a class of self-optimizing control strategies that can dynamically search for the unknown and/or time-varying inputs of a system for optimizing a certain performance index. Extremum-seeking optimization can be considered a dynamic realization of gradient searching through the use of dither signals. The gradient of the system output y with respect to the system input u can be obtained by slightly perturbing the system operation and applying a demodulation measure. Various implementations of extremum-seeking optimization are described in detail in U.S. Pat. Nos. 8,473,080, 7,827,813, 8,027,742, 8,200,345, 8,200,344, U.S. patent application Ser. No. 14/495,773, U.S. patent application Ser. No. 14/538,700, U.S. patent application Ser. No. 14/975,527, U.S. patent application Ser. No. 14/961,747, U.S. patent application Ser. No. 15/080,435, and U.S. patent application Ser. No. 15/284,468. Each of these patents and patent applications is incorporated by reference herein.

Modern systems often have a myriad of inputs $x_1, x_2, \ldots, x_n$ that can be manipulated to optimize the system performance variable y. If there is linear relationship among the manipulated variables $x_1, x_2, \ldots x_n$, latent variables $w_1, w_2, \ldots, w_p$ can be generated to capture such linear relationship. In other words, the total possible number n of manipulated variables $x_1, x_2, \ldots, x_n$ can be mapped onto a smaller set of p (p<n) latent variables $w_1, w_2, \ldots, w_p$ for multivariable extremum-seeking optimization. Each of the latent variables $w_1, w_2, \ldots, w_p$ is a linear combination of the original manipulated variables $x_1, x_2, \ldots, x_n$. Instead of using the original manipulated variables $x_1, x_2, \ldots, x_n$, the multivariable extremum-seeking optimization process operates in the reduced dimension of space $w_1, w_2, \ldots, w_p$ to optimize the performance variable y. Because the multivariable extremum-seeking optimization process controls the smaller set of latent variables and operates in a smaller dimensional space, complexity and computational load can be reduced.

The number p of the latent variables used in extremum-seeking optimization can be determined based on measures such as variance (e.g., in principle component analysis), prediction errors (e.g., in partial least squares), correlation (e.g., in canonical correlation analysis), and so on. In operation, the gradient of the system performance variable y with respect to the latent variables $w_1, w_2, \ldots, w_p$ can be obtained by slightly perturbing the system operation and applying a demodulation measure. The perturbed latent variables $w_1, w_2, \ldots, w_p$ can be mapped back onto the larger set of manipulated variables $x_1, x_2, \ldots x_n$, which are then provided as input to the controlled system to affect the performance variable y. The system performance variable y can be provided as a feedback to the multivariable extremum-seeking optimization process to drive the gradient of the performance variable y towards zero.

The dimension reduction technique for multivariable extremum-seeking optimization discussed herein may include two parts. The first part is to determine a dimension reduction mapping matrix A that creates the set of p latent variables $w_1, w_2, \ldots, w_p$ from the original n manipulated variables $x_1, x_2, \ldots, x_n$. The manipulated variables $x_1, x_2, \ldots, x_n$ can be excited and the influence on the system performance variable y can be observed. The dimension reduction mapping matrix A can be determined based on the data obtained from the excitation process by using, for example, principle component analysis (PCA), partial least squares (PLS), canonical correlation analysis (CCA), etc. The second part is to deploy a dimension increase mapping matrix B that maps the modulated latent variables $w_1, w_2, \ldots, w_p$ back onto the manipulated variables $x_1, x_2, \ldots, x_n$ for inputting into the system to affect the performance variable y. The dimension reduction mapping matrix A obtained in the first part can be used to calculate B.

Building and HVAC System

Figure 2:
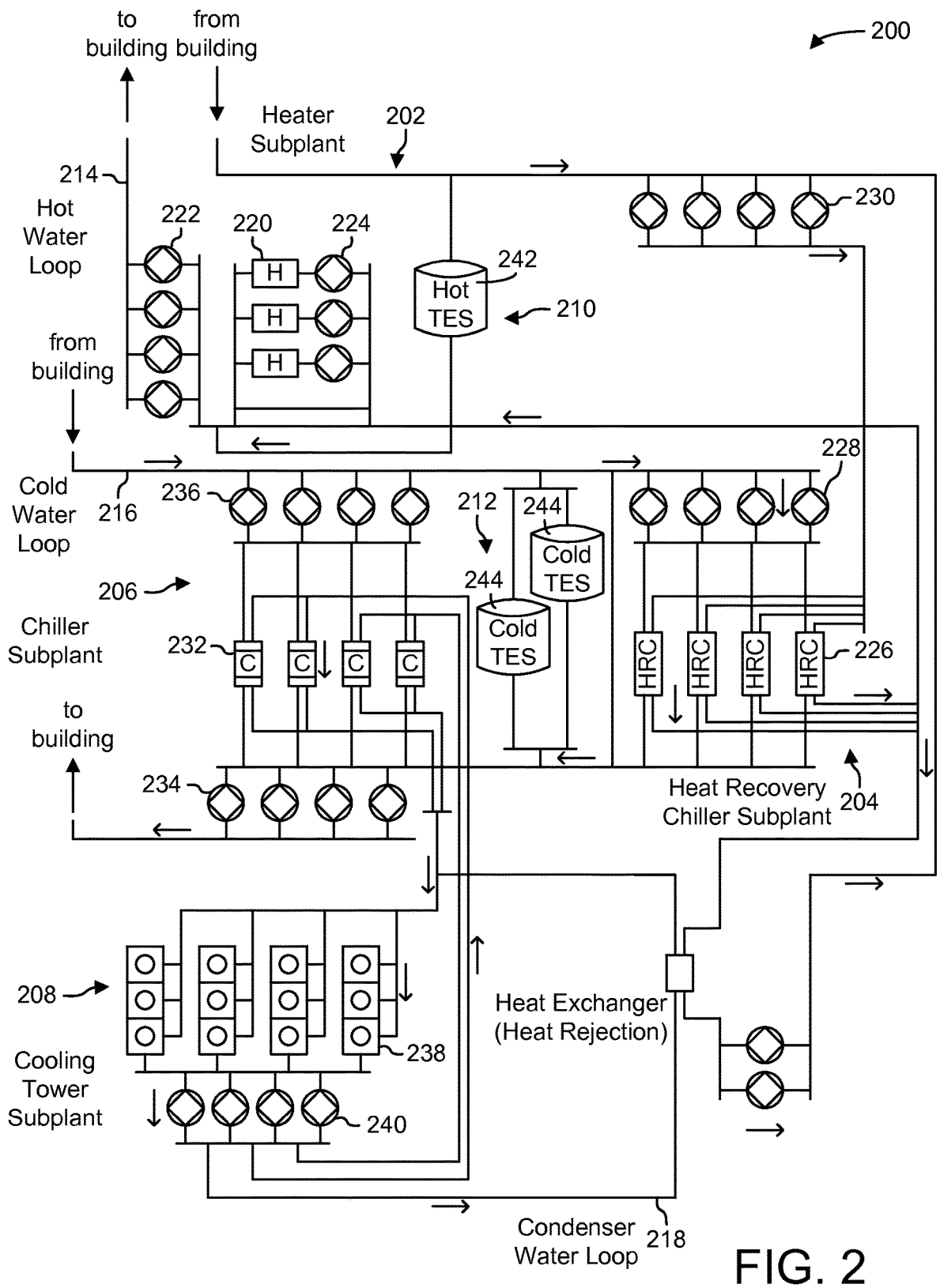
FIG. 2 is a schematic diagram of a waterside system which can be used in the HVAC system of FIG. 1, according to some embodiments.
Figure 3:
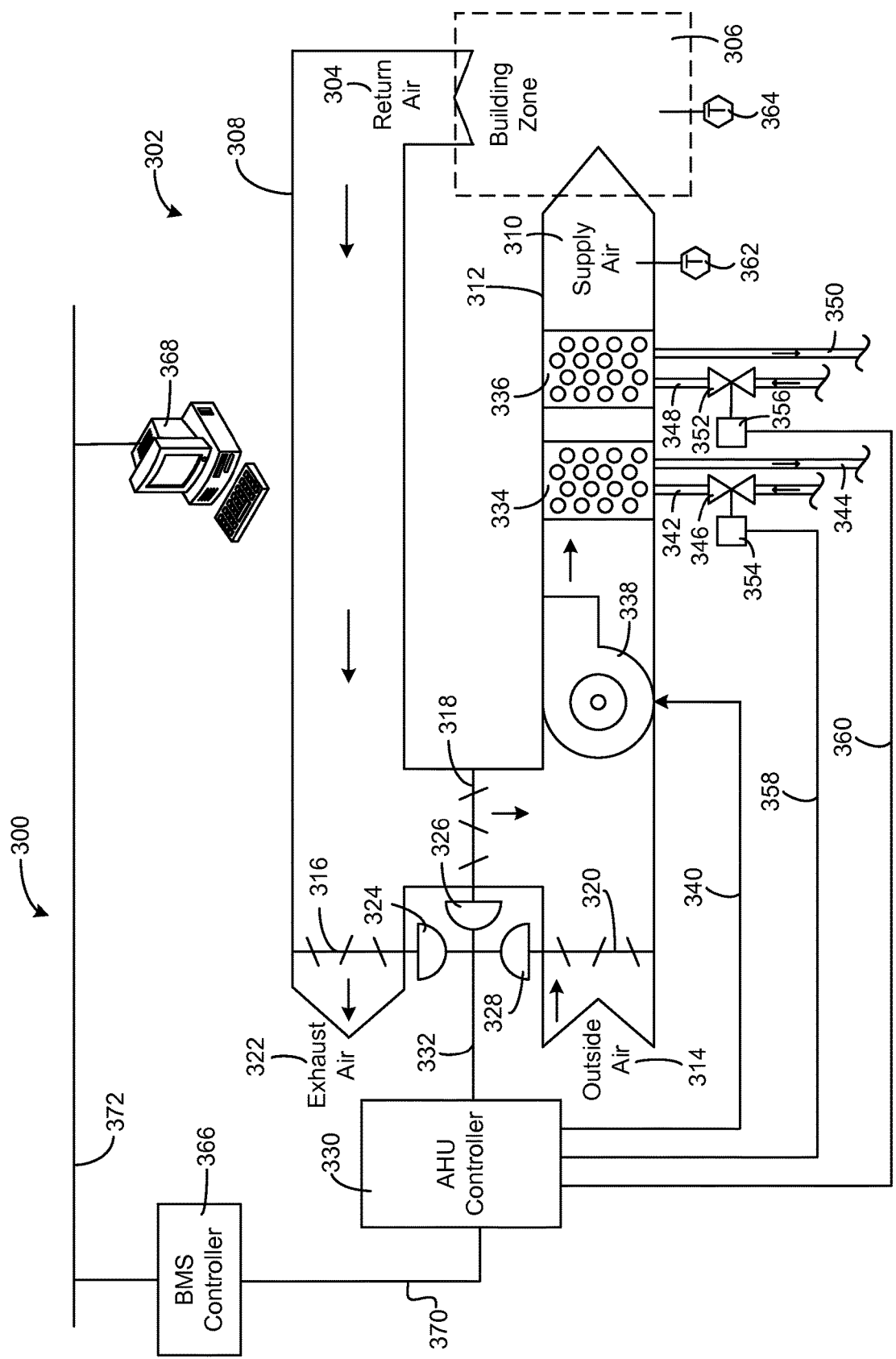
FIG. 3 is a schematic diagram of an airside system which can be used in the HVAC system of FIG. 1, according to some embodiments.

Referring now to FIGS. 1-3, a building 10 having a HVAC system 20 in which a dimension reduction technique for multivariable extremum-seeking optimization can be implemented is shown, according to some embodiments. Although the systems and methods of the present disclosure are described primarily in the context of a building HVAC system, it should be understood that the technique is generally applicable to any type of control system that optimizes or regulates a variable of interest using multiple inputs. For example, the control systems and methods of the present disclosure can be used to optimize an amount of energy produced by various types of energy producing systems or devices (e.g., power plants, steam or wind turbines, solar panels, combustion systems, etc.) and/or to optimize an amount of energy consumed by various types of energy consuming systems or devices (e.g., electronic circuitry, mechanical equipment, aerospace and land-based vehicles, building equipment, HVAC devices, refrigeration systems, etc.).

In various implementations, dimension reduction for multivariable extremum-seeking optimization can be used in any type of controller that functions to achieve a setpoint for a variable of interest (e.g., by minimizing a difference between a measured or calculated input and a setpoint) and/or optimize a variable of interest (e.g., maximize or minimize an output variable) using multiple variables. It is contemplated that extremum-seeking optimization can be readily implemented in various types of controllers (e.g., motor controllers, power controllers, fluid controllers, HVAC controllers, lighting controllers, chemical controllers, process controllers, etc.) and various types of control systems (e.g., closed-loop control systems, open-loop control systems, feedback control systems, feed-forward control systems, etc.). All such implementations should be considered within the scope of the present disclosure.

Referring now to FIGS. 1-3, several HVAC systems in which the systems and methods of the present disclosure can be implemented are shown, according to some embodiments. In brief overview, FIG. 1 shows a building 10 equipped with a HVAC system 100. FIG. 2 is a schematic diagram of a waterside system which can be used in the HVAC system of FIG. 1. FIG. 3 is a schematic diagram of an airside system which can be used in the HVAC system of FIG. 1.

Building 10 and HVAC System 100

Referring particularly to FIG. 1, a perspective view of a building 10 is shown. Building 10 is served by a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106.

Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System 200

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 and building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System 300

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

System for Dimension Reduction for Multivariable Extremum-Seeking Optimization

Figure 4:
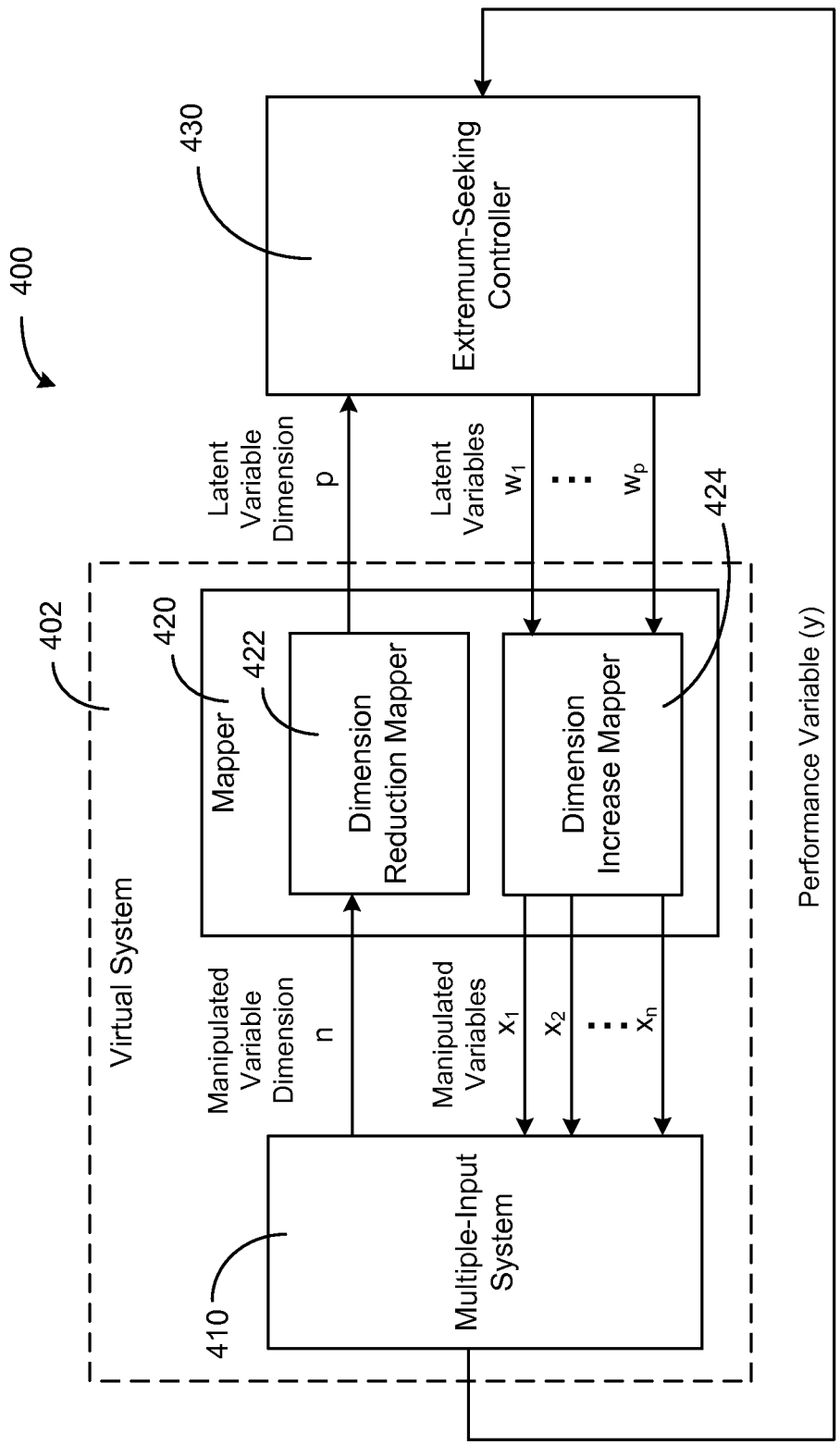
FIG. 4 is a block diagram of a system for dimension reduction for multivariable extremum-seeking optimization, according to some embodiments.

Referring now to FIG. 4, a block diagram of a system 400 for dimension reduction for multivariable extremum-seeking optimization is shown, according to some embodiments. System 400 is shown to include a multiple-input system 410, a mapper 420, and an extremum-seeking controller 430. Multiple-input system 410 may include a combination of a process and one or more mechanically-controlled outputs. For example, multiple-input system 410 can be an air handling unit configured to control temperature within a building space via one or more mechanically-controlled actuators and/or dampers. In various embodiments, multiple-input system 410 can include a chiller operation process, a damper adjustment process, a mechanical cooling process, a ventilation process, a refrigeration process, or any other process in which multiple inputs to system 410 (i.e., manipulated variables $x_1, x_2, \ldots x_n$) are adjusted to affect one or more outputs from system 410 (i.e., performance variable y). In some embodiments, system 410 is a multiple-input single-output (MISO) system. However, it should be understood that the single-output embodiment described herein is provided as an example and should not be construed as limiting. In other embodiments, system 410 may have a plurality of outputs (e.g., multiple performance variables $y_1, y_2, \ldots y_m$).

The performance variable y can include, for example, power consumption by system 410, or any variable that indicates the performance of multiple-input system 410. A plurality of manipulated variables $x_1, x_2, \ldots x_n$ can include one or more temperatures (e.g., chilled water temperature, return water temperature, refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, fan speeds, or any other variables that can be manipulated to affect the performance variable y. There is linear relationship among at least some of the manipulated variables $x_1, x_2, \ldots x_n$.

Mapper 420 is shown to include a dimension reduction mapper 422 and a dimension increase mapper 424. Dimension reduction mapper 422 is configured to project the original n dimensional space of manipulated variables $x_1, x_2, \ldots x_n$ onto a new smaller p (p<n) dimensional space including a smaller set of p latent variables $w_1, w_2, \ldots w_p$. The latent variables $w_1, w_2, \ldots w_p$ are created from linear combinations of the manipulated variables $x_1, x_2, \ldots x_n$. In other words, at least some of the manipulated variables $x_1, x_2, \ldots x_n$ are linearly related and the latent variables $w_1, w_2, \ldots w_p$ are produced to capture the relationship. For example, the latent variable $w_1$ is represented by:

$$w_1 = \Sigma_{i=1}^{n} a_{1,i} x_i \qquad (1),$$

where $a_{1,i}$ is a linear coefficient indicating how much weight the manipulated variable $x_i$ has in the latent variable $w_1$. In vector form, equation (1) can be written as:

$$w_1 = a_1^T x \qquad (2),$$

where $a_1 = [a_{11}\ a_{12}\ \ldots\ a_{1n}]^T$ is a vector of linear coefficients, and $x = [x_1\ x_2\ \ldots\ x_n]^T$ is a vector of the manipulated variables. Additional latent variables are $w_2 = a_2^T x$, $w_3 = a_3^T x$, ..., $w_p = a_p^T x$. In general, the latent variable vector $w = [w_1\ w_2\ \ldots\ w_p]^T$ is given by:

$$w = A^T x \qquad (3),$$

where $A = [a_1\ a_2\ \ldots\ a_p]$ is the dimension reduction mapping matrix that maps the manipulated variables x onto the latent variables w. The number p of the latent variables and the dimension reduction mapping matrix A can be determined using various approaches, such as principle component analysis (PCA), partial least squares (PLS), canonical correlation analysis (CCA), among others. These approaches are discussed in detail below with reference to FIGS. 4-6.

Dimension reduction mapper 422 can reduce the dimensionality of the space in which extremum-seeking controller 430 operates. In some embodiments, dimension reduction mapper 422 receives an indication of the manipulated variables $x_1, x_2, \ldots x_n$ and/or the dimension n of the manipulated variables from multiple-input system 410. Dimension reduction mapper 422 can be configured to identify all of the manipulated variables $x_1, x_2, \ldots x_n$ that can be provided as inputs to multiple-input system 410. In some embodiments, dimension reduction mapper 422 identifies which of the manipulated variables $x_1, x_2, \ldots x_n$ are linearly related to each other. Dimension reduction mapper 422 can translate the set of n manipulated variables $x_1, x_2, \ldots x_n$ into a set of p latent variables $w_1, w_2, \ldots w_p$. Dimension reduction mapper 422 can provide an indication of the latent variables $w_1, w_2, \ldots w_p$ and/or the dimension p of the latent variables $w_1, w_2, \ldots w_p$ to extremum-seeking controller 430.

Extremum-seeking controller 430 uses the latent variables $w_1, w_2, \ldots w_p$ instead of the manipulated variables $x_1, x_2, \ldots x_n$ to optimize the performance variable y. Extremum-seeking controller 430 can optimize the value of the performance variable y by driving a performance gradient y' to zero because when the gradient y' is zero, the performance variable y has an extremum value (e.g., a maximum or minimum). In some embodiments, extremum-seeking controller 430 is a multivariable extremum-seeking controller that determines optimal values for all the latent variables $w_1, w_2, \ldots w_p$. In other embodiments, extremum-seeking controller 430 includes a plurality of single-variable extremum-seeking controllers each assigned to a different latent variable $w_1, w_2, \ldots w_p$ and configured to determine an optimal value for the assigned latent variable. In yet other embodiments, extremum-seeking controller 430 is a hybrid controller configured to operate in multiple different operating modes. Details of various implementations of extremum-seeking controller 430 are discussed below with reference to FIGS. 8-10.

Extremum-seeking controller 430 may perturb the latent variables $w_1, w_2, \ldots w_p$ in order to extract the performance gradient y'. In some embodiments, extremum-seeking controller 430 recursively updates the latent variables $w_1, w_2, \ldots w_p$ based on a measurement or other indication of the performance variable y received from multiple-input system 410 as a feedback. Performance variable y can be output by multiple-input system 410 or observed at multiple-input system 410 (e.g., via a sensor) and provided to extremum-seeking controller 430.

The latent variables $w_1, w_2, \ldots w_p$ modulated by and output from extremum-seeking controller 430 can be mapped back to the space of manipulated variables $x_1, x_2, \ldots x_n$ by dimension increase mapper 424 before being fed to multiple-input system 410 to influence the performance variable y. Dimension increase mapper 424 may recover the manipulated variables $\hat{x}=[x_1 \, x_2 \ldots x_n]^T$ from the modulated latent variables $w=[w_1 \, w_2 \ldots w_p]^T$ as follows:

$$\hat{x}=Bw \quad (4),$$

where B is the dimension increase mapping matrix (or the reverse mapping matrix). B can be calculated according to the equation:

$$A^T B = I \quad (5).$$

As discussed herein, extremum-seeking controller 430 uses the latent variables $w_1, w_2, \ldots w_p$ instead of the manipulated variables $x_1, x_2, \ldots x_n$ to optimize the performance variable y. From the perspective of extremum-seeking controller 430, multiple-input system 410 and mapper 420 can be viewed as one system (i.e., virtual system 402, encompassed by dashed lines in FIG. 4) with p inputs that can be manipulated. Hence, extremum-seeking controller 430 only controls the smaller set of p latent variables and operates in a smaller dimensional space with lower complexity and computational load.

PCA Mapper

Figure 5:
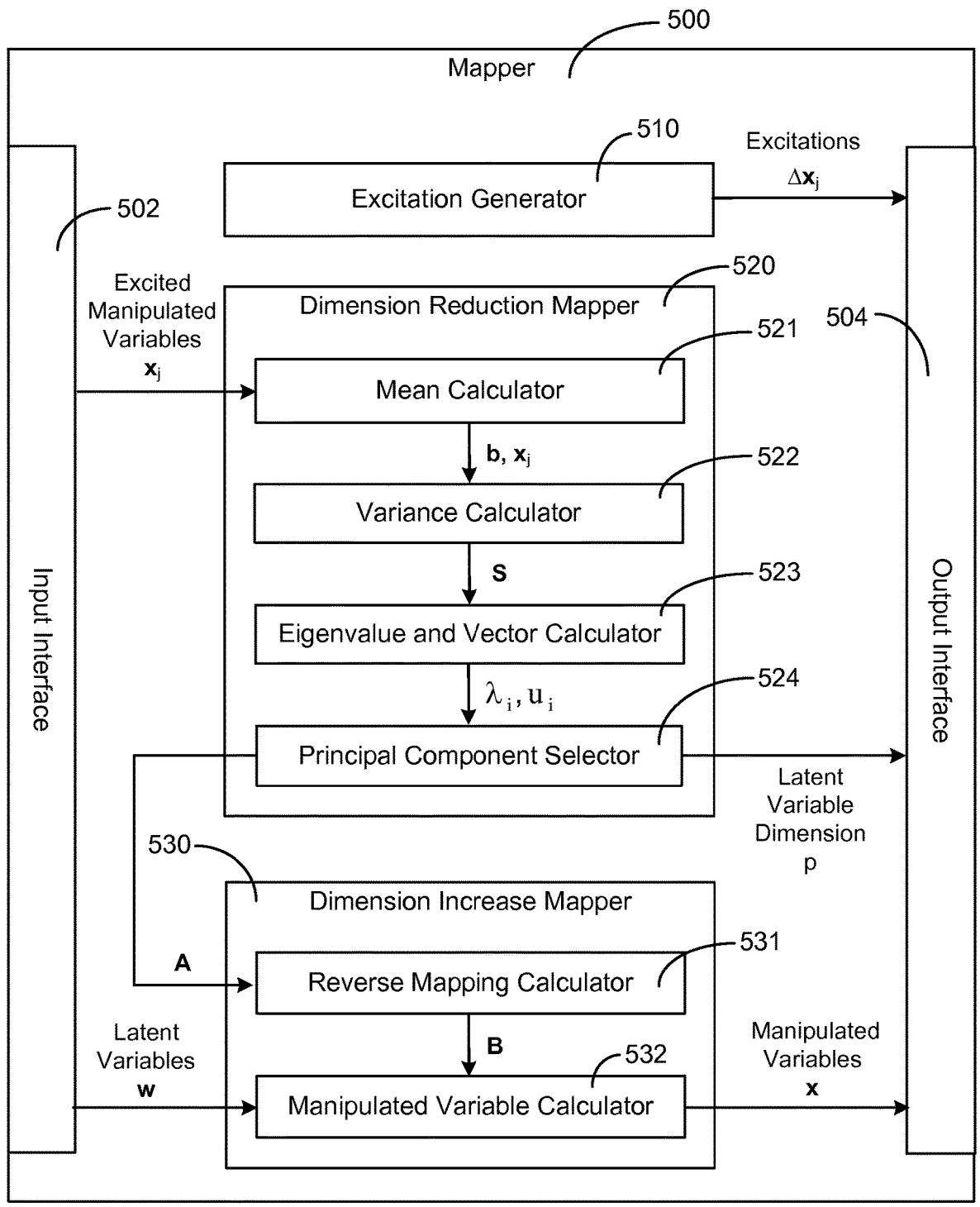
FIG. 5 is a block diagram of a mapper utilizing principle component analysis (PCA) for dimension reduction, which can be used in the system of FIG. 4, according to some embodiments.

Referring to FIG. 5, a block diagram of a mapper 500 that uses principal component analysis (PCA) for dimension reduction is shown, according to some embodiments. Mapper 500 can be used as mapper 420 in FIG. 4. Mapper 500 is shown to include an input interface 502, an output interface 504, an excitation generator 510, a dimension reduction mapper 520, and a dimension increase mapper 530. Mapper 500 is configured to use PCA to reduce the dimension n of the manipulated variables to the dimension p of latent variables.

In operation, excitation generator 510 generates excitations $\Delta x_j = [\Delta x_1 \, \Delta x_2 \ldots \Delta x_n]^T$ to the manipulated variables $x = [x_1 \, x_2 \ldots x_n]^T$ and outputs the excitations $\Delta x_j$ to a multiple-input system (e.g., multiple-input system 410 of FIG. 4) via output interface 504. The subscript j indicates that the excitation $\Delta x_j$ is the jth excitation in a series of excitations. As discussed above, the manipulated variables $x_1, x_2, \ldots x_n$ can include one or more temperatures (e.g., chilled water temperature, return water temperature, refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, fan speeds, or any other variables that can be manipulated to affect the performance variable y. Excitations to these variables can be generated by changing temperature setpoints, pressure setpoints, flow rate setpoints, valve position setpoints, fan speed setpoints, and/or the like.

In some embodiments, excitation generator 510 generates an excitation (i.e., a change) to one manipulated variable at a time. Values of manipulated variable(s) correlated with the excited variable may change as well. For example, excitation generator 510 may generate an excitation to increase the fan speed of a cooling tower fan system in a chilled water plant. As the fan speed increases, the amount of heat removed from the condensed water by the fan increases and temperature of the condensed water drops accordingly. Thus, although excitation generator 510 does not directly generate an excitation to the condensed water temperature, the temperature changes due to correlation with the fan speed.

In other embodiments, excitation generator 510 generates excitations to more than one manipulated variables at a time. However, it is possible not all the excited variables can change exactly as being excited due to correlation among the variables. For example, excitation generator 510 may generate a first excitation to increase the fan speed of a cooling tower fan system in a chilled water plant and at the same time generates a second excitation to increase the setpoint for the condensed water temperature. Because the fan speed has a shorter time constant (i.e., shorter response time) than the condensed water temperature, the fan speed may achieve the speed being commanded by excitation generator 510 immediately. It may take a longer response time for the condensed water temperature to change (e.g., through flow rate of a water pump), which might not achieve the setpoint commanded by excitation generator 510 at the time of sampling. It should be noted that in some embodiments, excitation generation 510 can be a component separate from the mapper 500.

As such, the manipulated variables x can be changed in the multiple-input system in response to the excitations $\Delta x_j$. $x_j$ represents the jth manipulated variable vector corresponding to the jth excitation $\Delta x_j$. All manipulated variables $x_j$ can be output by the multiple-input system or observed at the multiple-input system (e.g., via a sensor) and provided to mapper 500 via input interface 502 at the time of sampling. Dimension reduction mapper 520 is configured to reduce dimensions by performing PCA on the manipulated variables $x_j$. Dimension reduction mapper 520 is shown to include a mean calculator 521, a variance calculator 522, an eigenvalue and vector calculator 523, and a principal component selector 524. Mean calculator 521 can calculate a mean vector b for M excited samples of manipulated variables $x_j$ as follows:

$$b = \frac{1}{M} \sum_{j=1}^{M} x_j. \quad (6)$$

Variance calculator 522 can receive the mean vector b and calculate a variance matrix S for the M excited samples of manipulated variables $x_j$ as follows:

$$S = \frac{1}{M} \sum_{j=1}^{M} (x_j - b)(x_j - b)^T = \frac{1}{M} \sum_{j=1}^{M} x_j x_j^T - bb^T. \quad (7)$$

Eigenvalue and vector calculator 523 can calculate eigenvalues $\lambda_1 > \lambda_2 > \ldots > \lambda_n$ and corresponding eigenvectors $u_1, u_2, \ldots, u_n$ for the variance matrix S obtained by variance calculator 522. Eigenvalues and eigenvectors satisfy the following equation:

$$Su_i = \lambda_i u_i, \; i=1,2,\ldots,n \quad (8)$$

Principal component selector 524 can determine the dimension p (p<n) of the latent variables for multivariable extremum-seeking optimization and can select the first p eigenvectors to include in the dimension reduction mapping matrix A. The cut-off number p can be determined as follows:

$$\Sigma_{i=1}^{P} \lambda_i / \Sigma_{i=1}^{N} \lambda_1 > \text{Threshold} \quad (9),$$

where Threshold represents the variance of the PCA method. Values of the Threshold parameter that are close to 1 may increase the accuracy of the extremum-seeking optimization, but may result in a larger number p of latent variables. Conversely, values of the Threshold parameter that are further from 1 may decrease the accuracy of the extremum-seeking optimization, but may result in a smaller number p of latent variables. The value of the Threshold parameter can be retrieved from memory, adaptively determined by dimension reduction mapper 520 or an external system or device, specified by a user, or received from any other data source. In some embodiments, the value of the Threshold parameter can be for example, 0.9 or 0.95.

The dimension reduction mapping matrix A is:

$$A = [u_1 u_2 \ldots u_p] \quad (10).$$

Thus, the latent variables $w = [w_1 \; w_2 \ldots w_p]^T$ are the linear combination of the manipulated variables $x = [x_1 \; x_2 \ldots x_n]^T$ (i.e., $w = A^T x$). Principal component selector 524 can output the latent variable dimension p to an extremum-seeking controller (e.g., extremum-seeking controller 430) via output interface 504. The extremum-seeking controller will operate in the dimension p of space.

Dimension increase mapper 530 can map the latent variables $w_1, w_2, \ldots w_p$ modulated by and output from the extremum-seeking controller back to the space of manipulated variables $x_1, x_2, \ldots x_n$, which can then be fed to the multiple-input system to influence the performance variable y. Dimension increase mapper 530 is shown to include a reverse mapping calculator 531 and a manipulated variable calculator 532. Reverse mapping calculator 531 receives the dimension reduction mapping matrix A obtained by principal component selector 524 and calculates reverse mapping matrix (or dimension increase mapping matrix) B according to equation (5) $A^T B = I$. Manipulated variable calculator 532 receives the modulated latent variables $w = [w_1 \; w_2 \ldots w_p]^T$ from the extremum-seeking controller via input interface 502 and calculates the manipulated variables $R = [x_1 \; x_2 \ldots x_n]^T$ according to equation (4) $\hat{x} = Bw$. The manipulated variables $\hat{x}$ can be provided to the multiple-input system via output interface 504 to affect the performance variable y. It should be understood that the PCA described with reference to FIG. 5 is for illustrative purposes only and should not be construed as limiting. Other variations of PCA can be used for dimension reduction in various alternative embodiments.

PLS Mapper

Figure 6:
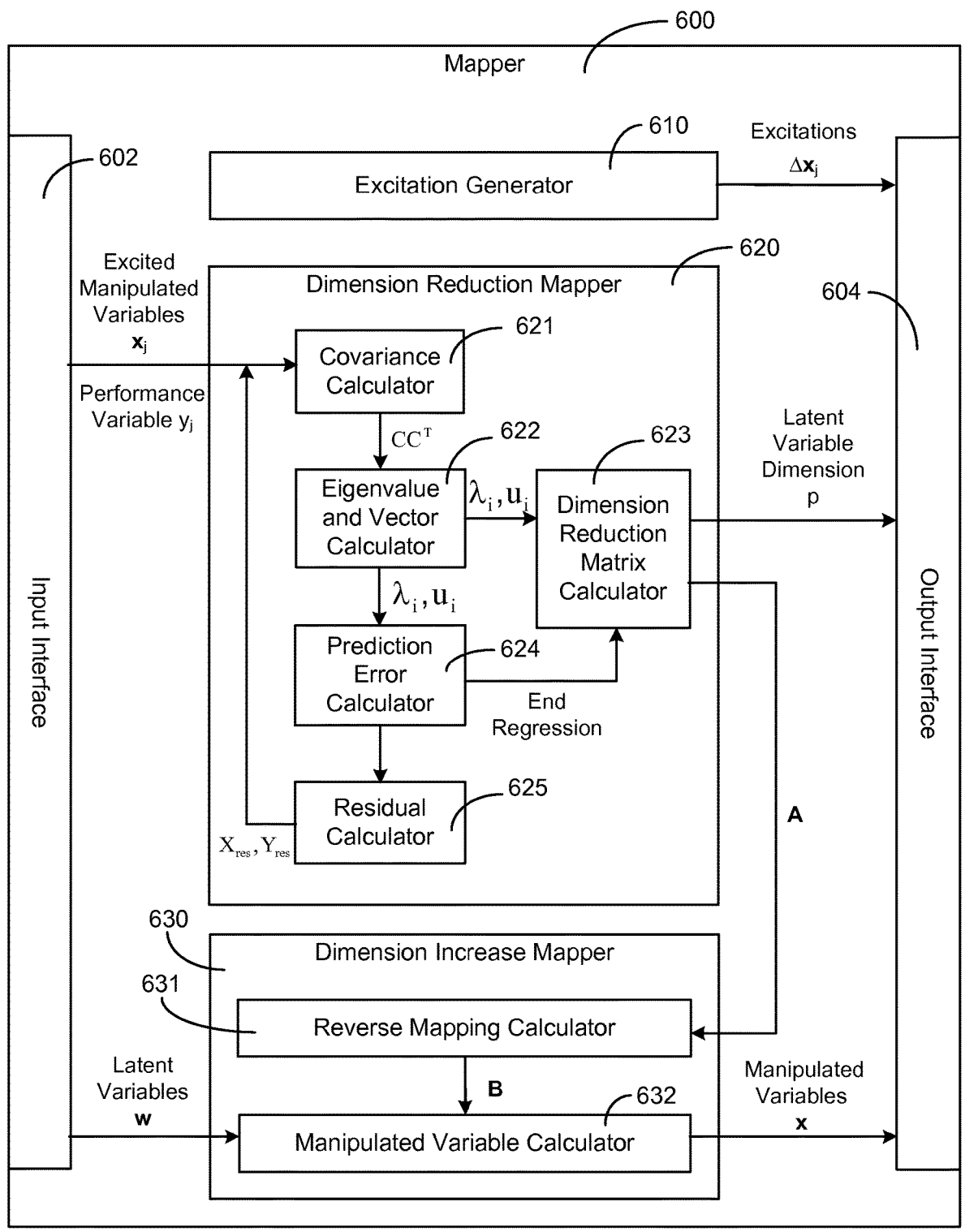
FIG. 6 is a block diagram of a mapper utilizing partial least squares (PLS) for dimension reduction, which can be used in the system of FIG. 4, according to some embodiments.

Referring to FIG. 6, a block diagram of a mapper 600 that uses partial least squares (PLS) for dimension reduction is shown, according to some embodiments. Mapper 600 can be used as mapper 420 in FIG. 4. Mapper 600 is shown to include an input interface 602, an output interface 604, an excitation generator 610, a dimension reduction mapper 620, and a dimension increase mapper 630. Mapper 600 may use PLS to reduce the dimension of the manipulated variables to the dimension of latent variables.

In operation, excitation generator 610 can be the same as or similar to excitation generator 510 of FIG. 5, which generates excitations $\Delta x_j = [\Delta x_1 \; \Delta x_2 \ldots \Delta x_n]^T$ to the manipulated variables $x = [x_1 \; x_2 \ldots x_n]^T$ and outputs the excitations $\Delta x_j$ to a multiple-input system (e.g., multiple-input system 410 of FIG. 4) via output interface 604. The subscript j indicates that the excitation $\Delta x_j$ is the jth excitation in a series of excitations. As discussed above, the manipulated variables $x_1, x_2, \ldots x_n$ can include one or more temperatures (e.g., chilled water temperature, return water temperature, refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, fan speeds, or any other variables that can be manipulated to affect the performance variable y. Excitations to these variables can be generated by changing temperature setpoints, pressure setpoints, flow rate setpoints, valve position setpoints, fan speed setpoints, and/or the like.

Like excitation generator 510 discussed above, in some embodiments, excitation generator 610 generates an excitation (i.e., a change) to one manipulated variable at a time. Values of manipulated variable(s) correlated with the excited variable may change as well. In other embodiments, excitation generator 610 generates excitations to more than one manipulated variables at a time. However, it is possible not all the excited variables can change exactly as being excited due to correlation among the variables. It should be noted that in some embodiments, excitation generation 610 can be a component separate from the mapper 600.

The manipulated variables x can be changed in the multiple-input system in response to the excitations $\Delta x_j$. $x_j$ represents the jth manipulated variable vector corresponding to the jth excitation $\Delta x_j$. $y_j$ represents the jth performance variable corresponding to the jth manipulated variables $x_j$. All manipulated variables $x_j$ and performance variable $y_j$ can be output by the multiple-input system or observed at the multiple-input system (e.g., via a sensor) and provided to mapper 600 via input interface 602. Dimension reduction mapper 620 is configured to reduce dimensions by performing PLS on the manipulated variables $x_j$ and performance variable $y_j$. Dimension reduction mapper 620 is shown to include a covariance calculator 621, an eigenvalue and vector calculator 622, a dimension reduction matrix calculator 623, a prediction error calculator 624, and a residual calculator 625.

Covariance calculator 621 can calculate a covariance vector C and covariance matrix $CC^T$ for M excited samples of manipulated variables $X=[x_1\ x_2\ \ldots\ x_M]^T$ and corresponding performance variables $Y=[y_1\ y_2\ \ldots\ y_M]^T$ as follows:

$$C = X^T Y \quad (11),$$

$$CC^T = X^T Y Y^T X \quad (12).$$

Eigenvalue and vector calculator 622 can calculate eigenvalues $\lambda_1 > \lambda_2 > \ldots > \lambda_n$ and corresponding eigenvectors $u_1, u_2, \ldots, u_n$ for covariance matrix $CC^T$. Eigenvalues and eigenvectors satisfy the following equation:

$$CC^T u_i = \lambda_i u_i, \quad i=1,2,\ldots,n \quad (13).$$

Eigenvalue and vector calculator 622 outputs the first eigenvector $u_1$ corresponding to the first (i.e., the largest) eigenvalue $\lambda_1$ to dimension reduction matrix calculator 623. The first eigenvector $u_1$ can form the first column of the dimension reduction mapping matrix A maintained by dimension reduction matrix calculator 623.

Prediction error calculator 624 can calculate a prediction error E for the PLS regression in progress. In some embodiments, the predication error E is a mean square error:

$$E = \frac{|Y - YC^T C|^2}{|Y|^2}. \quad (14)$$

In some embodiments, prediction error calculator 624 compares the prediction error E with a threshold value (e.g., Threshold). If the prediction error E is not greater than the Threshold, prediction error calculator 624 may determine to end PLS regression and send an "End Regression" signal to dimension reduction matrix calculator 623. If the prediction error E is greater than the Threshold, prediction error calculator 624 may determine to continue PLS regression. The value of the Threshold parameter can be retrieved from memory, adaptively determined by dimension reduction mapper 620 or an external system or device, specified by a user, or received from any other data source. In some embodiments, the value of the Threshold parameter can be for example, 0.1 or 0.05.

If the PLS regression continues, residual calculator 625 can calculate residuals $X_{res}$ and $Y_{res}$:

$$X_{res} = X - tt^T X \quad (15),$$

$$Y_{res} = Y - tt^T Y \quad (16).$$

In the above equations, $t = Xu_1$ is the x-score vector. Residual calculator 625 outputs the residuals $X_{res}$ and $Y_{res}$ to the covariance calculator 621. The residual $X_{res}$ and $Y_{res}$ replace the original X and Y in equations (11)-(14) and the PLS regression continues. That is, a new first $u_1$ corresponding to a new first (i.e., largest) eigenvalue $\lambda_1$ of the new covariance matrix can form the second column of the dimension reduction matrix A, and so on.

The regression continues until prediction error calculator 624 determines that the prediction error E is not greater than the Threshold. Prediction error calculator 624 then sends an "End Regression" signal to dimension reduction matrix calculator 623. In response to receiving the signal, dimension reduction matrix calculator 623 can count the number of columns in the dimension reduction matrix A, which is the dimension p of the latent variables. The latent variables $w = [w_1\ w_2\ \ldots\ w_p]^T$ are the linear combination of the manipulated variables $x = [x_1\ x_2\ \ldots\ x_n]^T$ (i.e., $w = A^T x$). Dimension reduction matrix calculator 623 can output the latent variable dimension p to an extremum-seeking controller (e.g., extremum-seeking controller 430) via output interface 604. The extremum-seeking controller will operate in the dimension p of space.

Dimension increase mapper 630 can be the same as or similar to dimension increase mapper 530 of FIG. 5, which can map the latent variables $w_1, w_2, \ldots w_p$ modulated by and output from the extremum-seeking controller back to the space of manipulated variables $x_1, x_2, \ldots x_n$. The manipulated variables $x_1, x_2, \ldots x_n$ can then be fed to the multiple-input system to influence the performance variable y. Dimension increase mapper 630 is shown to include a reverse mapping calculator 631 and a manipulated variable calculator 632. Reverse mapping calculator 631 receives the dimension reduction mapping matrix A obtained by dimension reduction matrix calculator 623 and calculates reverse mapping matrix (or dimension increase mapping matrix) B according to equation (5) $A^T B = I$. Manipulated variable calculator 632 receives the modulated latent variables $w = [w_1\ w_2\ \ldots\ w_p]^T$ from the extremum-seeking controller via input interface 602 and calculates the manipulated variables $x = [x_1\ x_2\ \ldots\ x_n]^T$ according to equation (4) $\hat{x} = Bw$. The manipulated variables $\hat{x}$ can be provided to the multiple-input system via output interface 604 to affect the performance variable y. It should be understood that the PLS described with reference to FIG. 6 is for illustration not for limitation. There may be all kinds of variations to the PLS for dimension reduction.

CCA Mapper

Figure 7:
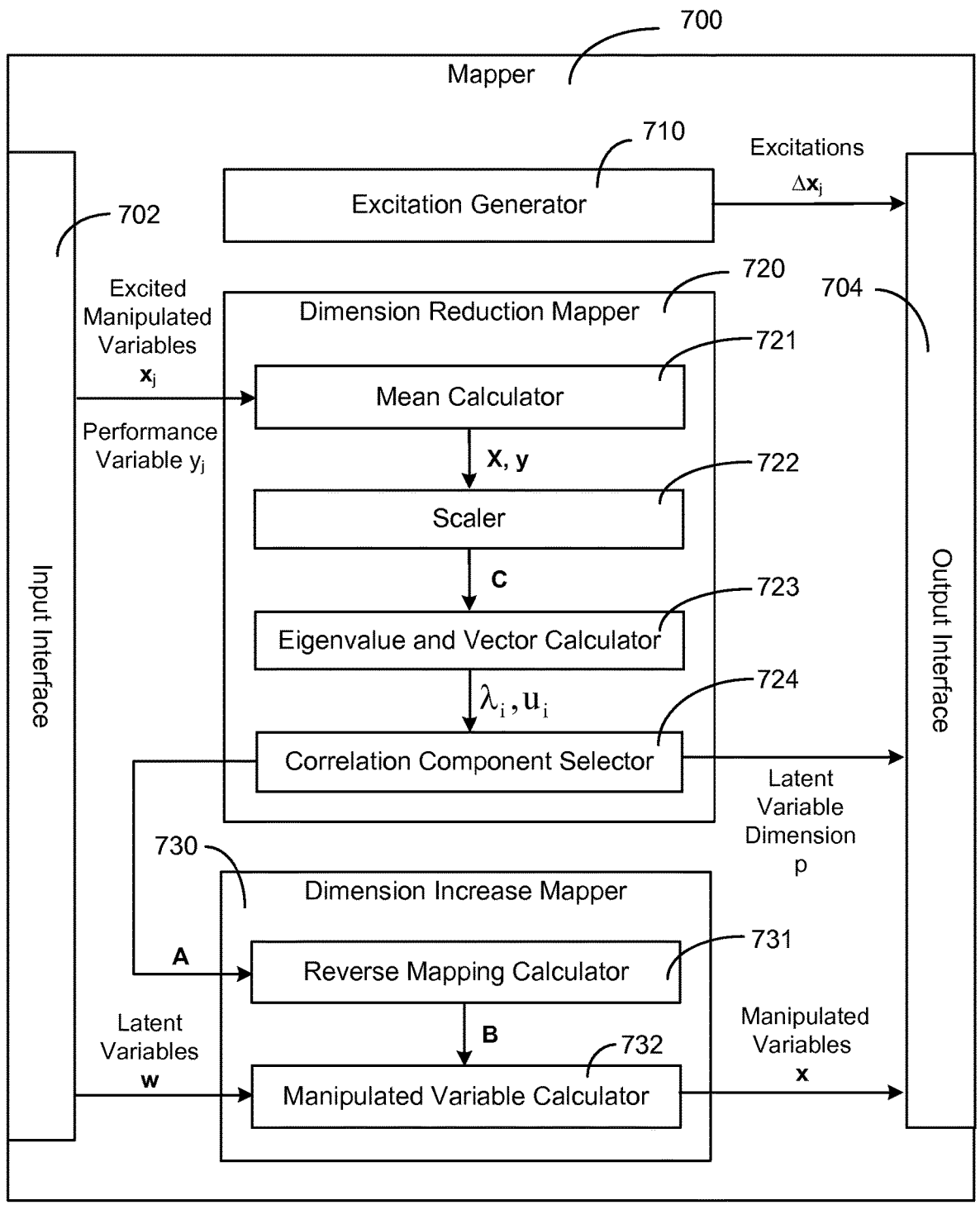
FIG. 7 is a block diagram of a mapper utilizing canonical correlation analysis (CCA) for dimension reduction, which can be used in the system of FIG. 4, according to some embodiments.

Referring to FIG. 7, a block diagram of a mapper 700 that uses canonical correlation analysis (CCA) for dimension reduction is shown, according to some embodiments. Mapper 700 can be used as mapper 420 in FIG. 4. Mapper 700 is shown to include an input interface 702, an output interface 704, an excitation generator 710, a dimension reduction mapper 720, and a dimension increase mapper 730. Mapper 700 may use CCA to reduce the dimension of the manipulated variables to the dimension of latent variables.

In operation, excitation generator 710 can be the same as or similar to excitation generator 510 of FIG. 5 or excitation generator 610 of FIG. 6, which generates excitations $\Delta x_j = [\Delta x_1\ \Delta x_2\ \ldots\ x_n]^T$ to the manipulated variables $x = [x_1\ x_2\ \ldots\ x_n]^T$ and outputs the excitations $\Delta x_j$ to a multiple-input system (e.g., multiple-input system 410 of FIG. 4) via output interface 704. The subscript j indicates that the excitation $\Delta x_j$ is the jth excitation in a series of excitations. As discussed above, the manipulated variables $x_1, x_2, \ldots x_n$ can include one or more temperatures (e.g., chilled water temperature, return water temperature, refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, fan speeds, or any other variables that can be manipulated to affect the performance variable y. Excitations to these variables can be generated by changing temperature setpoints, pressure setpoints, flow rate setpoints, valve position setpoints, fan speed setpoints, and/or the like.

Like excitation generator 510 discussed above, in some embodiments, excitation generator 710 generates an excitation (i.e., a change) to one manipulated variable at a time.

Values of manipulated variable(s) correlated with the excited variable may change as well. In other embodiments, excitation generator 710 generates excitations to more than one manipulated variables at a time. However, it is possible not all the excited variables can change exactly as being excited due to correlation among the variables. It should be noted that in some embodiments, excitation generation 710 can be a component separate from the mapper 700.

The manipulated variables x can be changed in the multiple-input system in response to the excitations $\Delta x_j$. $x_j$ represents the jth manipulated variable vector corresponding to the jth excitation $\Delta x_j$. $y_j$ represents the jth performance variable corresponding to the jth manipulated variables $x_j$. All manipulated variables $x_j$ and performance variable $y_j$ can be output by the multiple-input system or observed at the multiple-input system (e.g., via a sensor) and provided to mapper 700 via input interface 702. Dimension reduction mapper 720 is configured to reduce dimensions by performing CCA on the manipulated variables $x_j$ and performance variable $y_j$. Dimension reduction mapper 720 is shown to include a mean calculator 721, a scaler 722, an eigenvalue and vector calculator 723, and a correlation component selector 724.

Mean calculator 721 can calculate a mean vector b for M excited samples of manipulated variables $x_j$ and a mean value for the performance variable $y_j$ as follows:

$$b = \frac{1}{M} \sum_{j=1}^{M} x_j, \quad (17)$$

$$r = \frac{1}{M} \sum_{j=1}^{M} y_j. \quad (18)$$

Scaler 722 can scale the original X and Y to zero mean:

$$\hat{x}_j = x_j - b = x_j - \frac{1}{M} \sum_{j=1}^{M} x_j, \quad (19)$$

$$X = [\hat{x}_1 \ \hat{x}_2 \ \ldots \ \hat{x}_M]^T, \quad (20)$$

$$Y = y - r(1, 1, \ldots 1)^T = y - \frac{1}{M} \sum_{j=1}^{M} y_j(1, 1, \ldots 1)^T. \quad (21)$$

Eigenvalue and vector calculator 723 can calculate eigenvalues $\lambda_1 > \lambda_2 > \ldots > \lambda_n$ and corresponding eigenvectors $u_1, u_2, \ldots, u_n$ that satisfy the following equation:

$$X^T Y (Y^T y)^{-1} Y^T X u_i = \lambda_i X^T X u_i, \ i=1,2,\ldots,n \quad (22).$$

Correlation component selector 724 can determine the dimension p (p<n) of the latent variables for multivariable extremum-seeking optimization and select first p eigenvectors to include in the dimension reduction mapping matrix A. The cut-off number p can be determined as follows:

$$\Sigma_{i=1}^{p} \lambda_i / \Sigma_{i=1}^{N} \lambda_i > \text{Threshold} \quad (23),$$

where Threshold represents the correlation of the CCA method. The value of the parameter Threshold can be retrieved from memory, adaptively determined by dimension reduction mapper 720 or an external system or device, specified by a user, or received from any other data source. In some embodiments, the value of the parameter Threshold can be for example, 0.9 or 0.95. The dimension reduction mapping matrix A is:

$$A = [u_1 \ u_2 \ \ldots \ u_p] \quad (24).$$

Thus, the latent variables $w = [w_1 \ w_2 \ \ldots \ w_p]^T$ are the linear combination of the manipulated variables $x = [x_1 \ x_2 \ \ldots \ x_n]^T$ (i.e., $w = A^T x$). Correlation component selector 724 can output the latent variable dimension p to an extremum-seeking controller (e.g., extremum-seeking controller 430) via output interface 704. The extremum-seeking controller will operate in the dimension p of space.

Dimension increase mapper 730 can be the same as or similar to dimension increase mapper 530 of FIG. 5 or dimension increase mapper 630 of FIG. 6, which can map the latent variables $w_1, w_2, \ldots w_p$ modulated by and output from the extremum-seeking controller back to the space of manipulated variables $x_1, x_2, \ldots x_n$. The manipulated variables $x_1, x_2, \ldots x_n$ can then be fed to the multiple-input system to influence the performance variable y. Dimension increase mapper 730 is shown to include a reverse mapping calculator 731 and a manipulated variable calculator 732. Reverse mapping calculator 731 receives the dimension reduction mapping matrix A obtained by correlation component selector 724 and calculates reverse mapping matrix (or dimension increase mapping matrix) B according to equation (5) $A^T B = I$. Manipulated variable calculator 732 receives the modulated latent variables $w = [w_1 \ w_2 \ \ldots \ w_p]^T$ from the extremum-seeking controller via input interface 702 and calculates the manipulated variables $\hat{x} = [x_1 \ x_2 \ \ldots \ x_n]^T$ according to equation (4) $\hat{x} = Bw$. The manipulated variables $\hat{x}$ can be provided to the multiple-input system via output interface 704 to affect the performance variable y. It should be understood that the CCA described with reference to FIG. 7 is for illustration not for limitation. There may be all kinds of variations to the CCA for dimension reduction.

Dimension Reduction Systems

Figure 8:
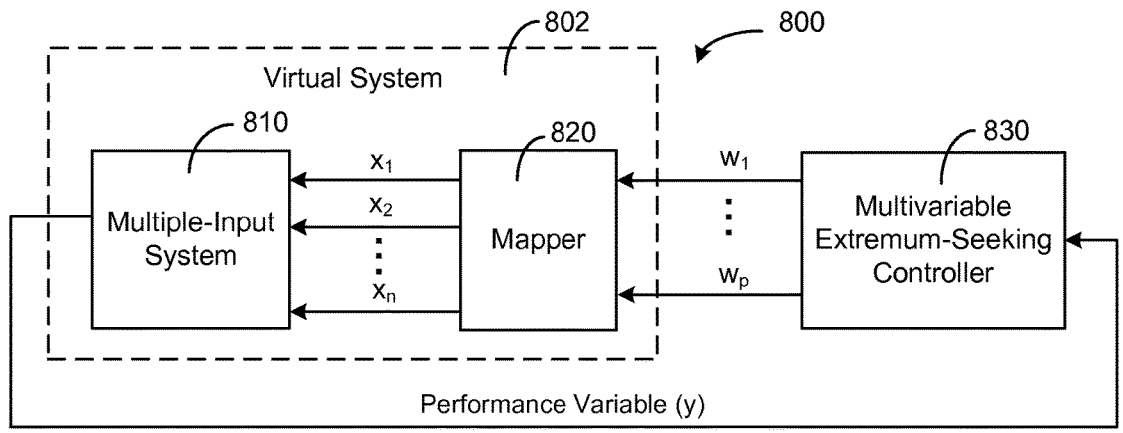
FIG. 8 is a block diagram of another system for dimension reduction for multivariable extremum-seeking optimization, according to some embodiments.

Referring now to FIG. 8, another system 800 for dimension reduction for multivariable extremum-seeking optimization is shown, according to some embodiments. System 800 is shown to include a multiple-input system 810, a mapper 820, and a multivariable extremum-seeking controller 830. Multiple-input system 810 can be the same as or similar to multiple-input system 410 of FIG. 4, which includes a combination of a process and one or more mechanically-controlled outputs. For example, multiple-input system 810 can be an air handling unit configured to control temperature within a building space via one or more mechanically-controlled actuators and/or dampers. In various embodiments, multiple-input system 810 can include a chiller operation process, a damper adjustment process, a mechanical cooling process, a ventilation process, a refrigeration process, or any other process in which multiple inputs to system 810 (i.e., manipulated variables $x_1, x_2, \ldots x_n$) are adjusted to affect one or more output from system 810 (i.e., performance variable y). It should be understood that the one output situation is described herein as an example but not for limitation. Systems and methods disclosed herein can be applied to situations of more than one output.

The performance variable y can include, for example, power consumption by system 810, or any variable that indicates the performance of multiple-input system 810. The manipulated variables $x_1, x_2, \ldots x_n$ can include one or more temperatures (e.g., chilled water temperature, return water temperature, refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, fan speed, or any other variables that can be manipulated to affect the performance variable y.

Mapper 820 can be the same as or similar to any of mapper 500, 600, or 700 as described with reference to FIGS. 5-7. Mapper 820 can project the original n dimensional space of manipulated variables $x_1, x_2, \ldots x_n$ onto a new smaller p (p<n) dimensional space including a smaller set of p latent variables $w_1, w_2, \ldots w_p$. Multivariable extremum-seeking controller 830 uses the latent variables $w_1, w_2, \ldots w_p$ instead of the manipulated variables $x_1, x_2, \ldots x_n$ to optimize the performance variable y. The latent variables $w_1, w_2, \ldots w_p$ modulated by and output from multivariable extremum-seeking controller 830 can be mapped back to the space of manipulated variables $x_1, x_2, \ldots x_n$ by mapper 820 before being fed to multiple-input system 810 to influence the performance variable y. From the perspective of multivariable extremum-seeking controller 830, multiple-input system 810 and mapper 820 can be viewed as one system (i.e., virtual system 802, encompassed by dashed lines in FIG. 8) with p inputs that can be manipulated. Hence, extremum-seeking controller 830 only controls the smaller set of p latent variables and operates in a smaller dimensional space with lower complexity and computational load.

Multivariable extremum-seeking controller 830 uses an extremum-seeking control technique to determine optimal values for the latent variables $w_1, \ldots, w_p$. In some embodiments, multivariable extremum-seeking controller 830 perturbs each manipulated variable $w_1, \ldots, w_p$ with a different excitation signal (e.g., a periodic dither signal or a stochastic excitation signal) and observes the effects of the excitation signals on the performance variably y. An example of such multivariable extremum-seeking controller 830 is described in U.S. patent application Ser. No. 15/284,468 filed Oct. 3, 2016. Multivariable extremum-seeking controller 830 can perform a dither-demodulation process for each latent variable $w_1, \ldots, w_p$ to determine a gradient of the performance variable y with respect to each latent variable $w_1, \ldots, w_p$. In some embodiments, each gradient is the partial derivative of the performance variable y with respect to one of the latent variables $w_1, \ldots, w_p$. For example, multivariable extremum-seeking controller 830 can determine the partial derivative $$\frac{\partial y}{\partial w_1}$$

of the performance variable y with respect to the latent variable $w_1$. Similarly, multivariable extremum-seeking controller 830 can determine the partial derivatives $$\frac{\partial y}{\partial w_2}, \ldots, \frac{\partial y}{\partial w_p}$$

of the performance variable y with respect to the remaining latent variables $w_2, \ldots, w_p$. In some embodiments, multivariable extremum-seeking controller 830 generates a vector D of the partial derivatives as shown in the following equation:

$$D = \begin{bmatrix} \frac{\partial y}{\partial u_1} & \frac{\partial y}{\partial u_2} & \cdots & \frac{\partial y}{\partial u_N} \end{bmatrix}^T, \qquad (25)$$

where each element of the vector D is the gradient of the performance variable y with respect to one of the latent variables $w_1, \ldots, w_p$. Multivariable extremum-seeking controller 830 can adjust the latent variables $w_1, \ldots, w_p$ to drive the vector D to zero.

In some embodiments, multivariable extremum-seeking controller 830 uses a Hessian matrix H of the partial derivatives to adjust the latent variables $w_1, \ldots, w_p$. The Hessian matrix H describes the local curvature of the performance variable y as a function of the multiple latent variables $w_1, \ldots, w_p$ (i.e., $y=f(w_1, w_2, \ldots w_p)$). In some embodiments, the Hessian matrix H is a square matrix of the second order partial derivatives, as shown in the following equation:

$$H = \begin{bmatrix} \frac{\partial^2 y}{\partial w_1^2} & \frac{\partial^2 y}{\partial w_1 \partial w_2} & \cdots & \frac{\partial^2 y}{\partial w_1 \partial w_p} \\ \frac{\partial^2 y}{\partial w_2 \partial w_1} & \frac{\partial^2 y}{\partial w_2^2} & \cdots & \frac{\partial^2 y}{\partial w_2 \partial w_p} \\ \vdots & \vdots & \ddots & \vdots \\ \frac{\partial^2 y}{\partial w_p \partial w_1} & \frac{\partial^2 y}{\partial w_p \partial w_2} & \cdots & \frac{\partial^2 y}{\partial w_p^2} \end{bmatrix}. \qquad (24)$$

Multivariable extremum-seeking controller 830 can use the Hessian matrix H to identify local extremums by determining whether the Hessian matrix H is positive definite (a local maximum) or negative definite (a local minimum). By driving the vector D to zero and/or evaluating the Hessian matrix H, multivariable extremum-seeking controller 830 can achieve an extremum (i.e., a maximum or minimum) for the performance variable y.

Figure 9:
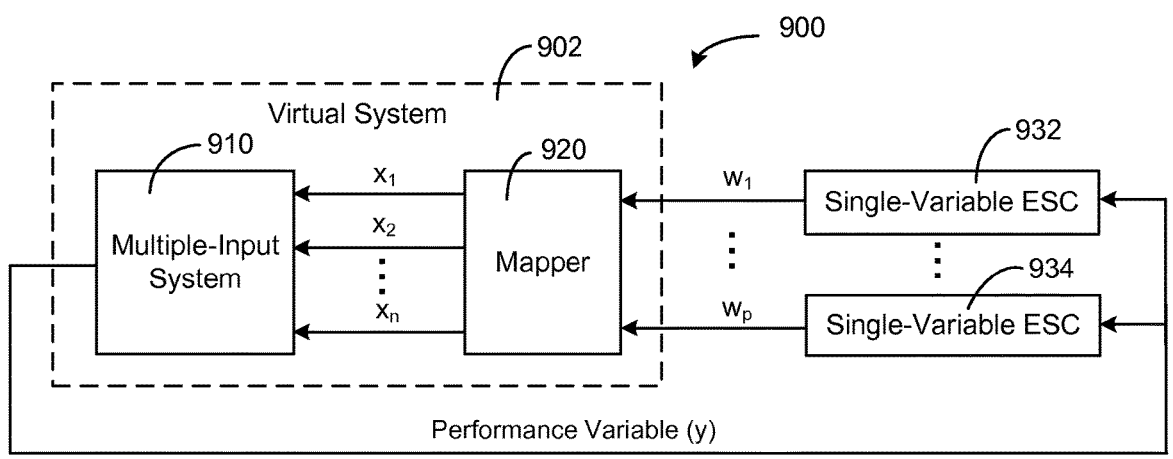
FIG. 9 is a block diagram of another system for dimension reduction for multivariable extremum-seeking optimization, according to some embodiments.

Referring now to FIG. 9, another system 900 for dimension reduction for multivariable extremum-seeking optimization is shown, according to some embodiments. System 900 is shown to include a multiple-input system 910, a mapper 920, and a plurality of single-variable extremum-seeking controllers 932 and 934. Although only two single-variable extremum-seeking controllers 932 and 934 are shown, it should be understood that any number of single-variable extremum-seeking controllers can be included in system 900. Each single-variable extremum-seeking controller 932 and 934 can be assigned to a different latent variable $w_1, \ldots, w_p$ and configured to determine an optimal value for the assigned latent variable using an extremum-seeking control technique. For example, single-variable extremum-seeking controller 932 can be assigned to latent variable $w_1$ and configured to drive $w_1$ to its optimal value; and single-variable extremum-seeking controller 934 can be assigned to latent variable $w_p$ and configured to drive $w_p$ to its optimal value. From the perspectives of single-variable extremum-seeking controllers 932 and 932, multiple-input system 910 and mapper 920 can be viewed as one system (i.e., virtual system 902, encompassed by dashed lines in FIG. 9) with p inputs that can be manipulated.

Each single-variable extremum-seeking controller 932 and 934 can receive the same performance variable y as an input from multiple-input system 910. However, each single-variable extremum-seeking controller 932 and 934 can correspond to a different control channel (i.e., a different latent variable) and can be configured to provide a value of the corresponding latent variable as an output to multiple-input system 910. In some embodiments, each single-variable extremum-seeking controller 932 and 934 applies a distinct and uncorrelated perturbation to the corresponding latent variable output. The perturbation can be a periodic dither signal or a stochastic excitation signal, as described in U.S. patent application Ser. No. 15/080,435 filed Mar. 24, 2016. If periodic dither signals are used, each single-variable extremum-seeking controller 932 and 934 can be configured to use a different dither frequency to allow the effects of each latent variable $w_1, \ldots, w_p$ to be uniquely identified in the performance variable y. If stochastic excitation signals are used, the stochastic signals are naturally uncorrelated with each other. This eliminates any requirement for communication or coordination between single-variable extremum-seeking controllers 932 and 934 when generating the perturbation signals. Each single-variable extremum-seeking controller 932 and 934 can extract the gradient of the performance variable y with respect to the corresponding latent variable $$\left(\text{e.g., } \frac{\partial y}{\partial w_1} \ldots \frac{\partial y}{\partial w_p}\right)$$

and can use an extremum-seeking control technique to drive the extracted gradient to zero.

Although system 900 is shown to include a multiple-input single-output system 910, it should be understood that a multiple-input multiple-output system can be substituted for multiple-input single-output system 910 in some embodiments. When a multiple-input multiple-output system is used in place of multiple-input single-output system 910, each single-variable extremum-seeking controller 932 and 934 can receive the same performance variable y or different performance variables $y_1 \ldots y_M$ as feedback outputs from the multiple-input multiple-output system. Each single-variable extremum-seeking controller 932 and 934 can extract the gradient of one of the performance variables with respect to one of the latent variables and can use an extremum-seeking control technique to drive the extracted gradient to zero. The single-variable extremum-seeking controllers 932 and 934 can operate independently from each other and do not require any information about interactions between latent variables $w_1, \ldots, w_p$ to drive their respective gradients to zero.

Figure 10:
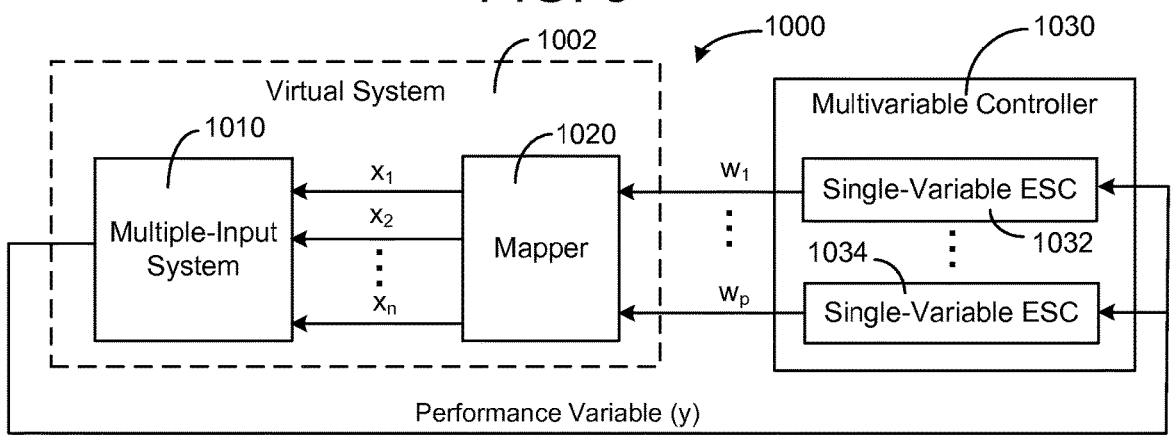
FIG. 10 is a block diagram of another system for dimension reduction for multivariable extremum-seeking optimization, according to some embodiments.

Referring now to FIG. 10, another system 1000 for dimension reduction for multivariable extremum-seeking optimization is shown, according to some embodiments. System 1000 is shown to include a multiple-input system 1010, a mapper 1020, and a multivariable controller 1030. Multivariable controller 1030 is shown to include a plurality of single-variable extremum-seeking controllers 1032 and 1034. In some embodiments, single-variable extremum-seeking controllers 1032 and 1034 are implemented as separate control modules or components of multivariable controller 1030. Although only two single-variable extremum-seeking controllers 1032 and 1034 are shown, it should be understood that any number of single-variable extremum-seeking controller can be included in multivariable controller 1030.

Single-variable extremum-seeking controllers 1032 and 1034 can be configured to perform some or all of the same functions as single-variable extremum-seeking controllers 932 and 934, as described with reference to FIG. 9. Each single-variable extremum-seeking controller 1032 and 1034 can be assigned to a different latent variable $w_1, \ldots, w_p$ and configured to determine an optimal value for the assigned latent variable using an extremum-seeking control technique. For example, single-variable extremum-seeking controller 1032 can be assigned to latent variable $w_1$ and configured to drive $w_1$ to its optimal value; and single-variable extremum-seeking controller 1034 can be assigned to latent variable $w_p$ and configured to drive $w_p$ to its optimal value. From the perspectives of single-variable extremum-seeking controllers 1032 and 1034, multiple-input system 1010 and mapper 1020 can be viewed as one system (i.e., virtual system 1002, encompassed by dashed lines in FIG. 10) with p inputs that can be manipulated.

Although system 1000 is shown to include a multiple-input single-output system 1010, it should be understood that a multiple-input multiple-output system can be substituted for multiple-input single-output system 1010 in some embodiments. When a multiple-input multiple-output system is used in place of multiple-input single-output system 1010, each single-variable extremum-seeking controller 1032 and 1034 can receive the same performance variable y or different performance variables $y_1 \ldots y_M$ as feedback outputs from the multiple-input multiple-output system. Each single-variable extremum-seeking controller 1032 and 1034 can extract the gradient of one of the performance variables with respect to one of the latent variables and can use an extremum-seeking control technique to drive the extracted gradient to zero.

In some embodiments, multivariable controller 1030 is configured to operate in multiple different operating modes. For example, multivariable controller 1030 can operate as a finite state machine or hybrid controller configured to evaluate state transition conditions and switch between multiple different operating states when the state transition conditions are satisfied. An example of such a hybrid controller is described in detail in U.S. patent application Ser. No. 15/232,800 filed Aug. 9, 2016, the entire disclosure of which is incorporated by reference herein. In some embodiments, each operating mode of multivariable controller 1030 is associated with a different subset of latent variables $w_1, \ldots, w_p$. For example, multivariable controller 1030 can provide a first subset $S_1 = \{w_1, w_4, w_5, w_7\}$ of latent variables $w_1, \ldots, w_p$ to multiple-input system 1010 when operating in a first operating mode, and a second subset $S_2 = \{w_1, w_2, w_3, w_6\}$ of latent variables $w_1, \ldots, w_p$ to multiple-input system 1010 when operating in a second operating mode. Each latent variable $w_1, \ldots, w_p$ can be controlled by a different single-variable extremum-seeking controller 1032 and 1034.

In some embodiments, multivariable controller 1030 is configured to switch between multiple different sets of single-variable extremum-seeking controllers 1032 and 1034 based on the operating mode of multivariable controller 1030. Multivariable controller 1030 can selectively activate and deactivate individual single-variable extremum-seeking controllers 1032 and 1034 based on which of the latent variables $w_1, \ldots, w_p$ are provided to multiple-input system 1010 in each operating mode. For example, multivariable controller 1030 can selectively activate the single-variable extremum-seeking controllers 1032 and 1034 configured to control the latent variables in subset $S_1$ upon transitioning into the first operating mode. Similarly, multivariable controller 1030 can selectively activate the single-variable extremum-seeking controllers 1032 and 1034 configured to control the manipulated variables in subset $S_2$ upon transitioning into the second operating mode. Multivariable controller 1030 can deactivate any of single-variable extremum-seeking controllers 1032 and 1034 not needed to control a manipulated variable provided to multiple-input system 1010 in the current operating mode.

Dimension Reduction Process

Figure 11:
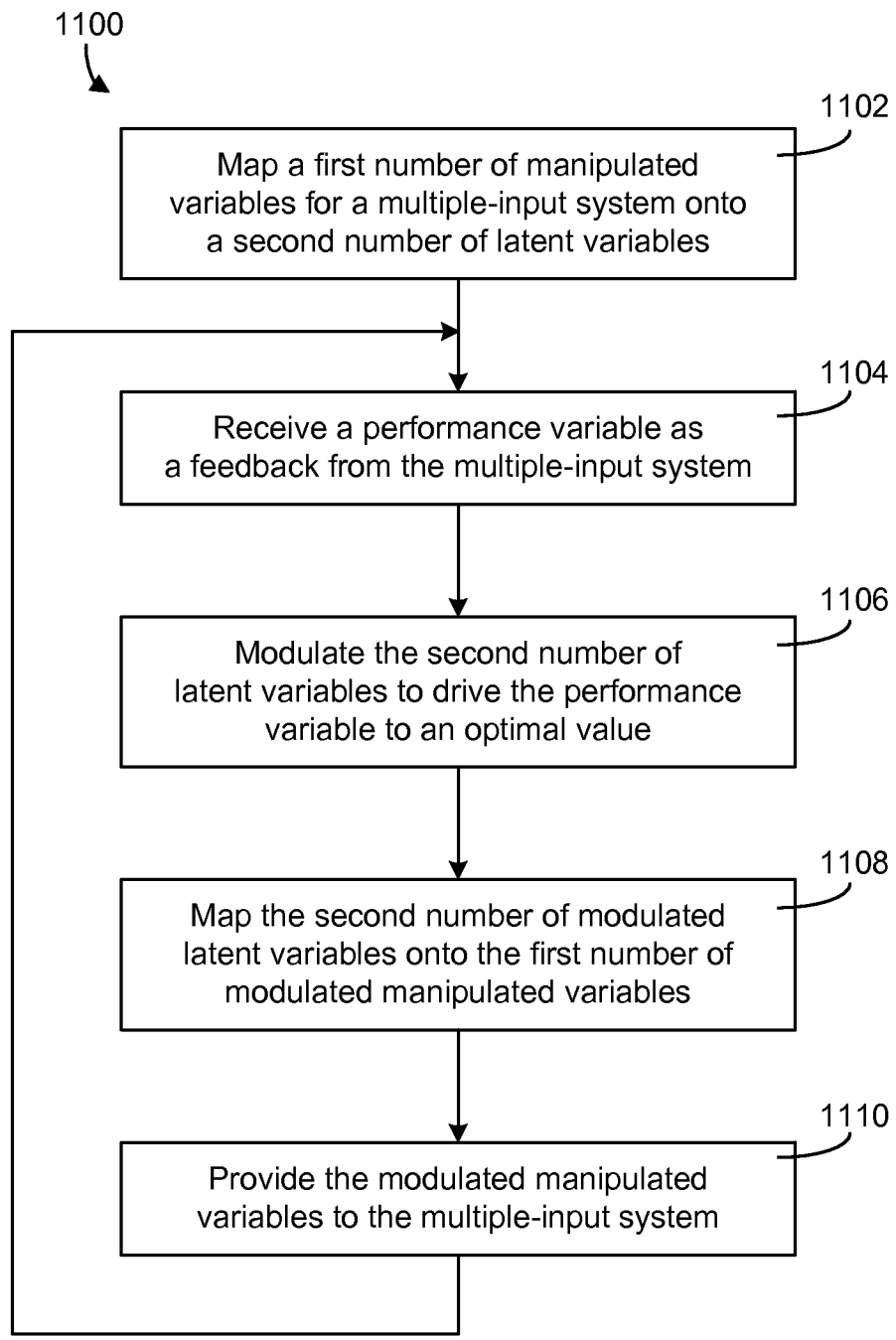
FIG. 11 is a flow diagram illustrating a method for dimension reduction for multivariable extremum-seeking optimization, according to some embodiments.

Referring now to FIG. 11, a flow diagram 1100 illustrating a method for dimension reduction for multivariable extremum-seeking control is shown, according to some embodiments. The method shown in flow diagram 1100 can be performed by a mapper (e.g., mapper 420 of FIG. 4, mapper 500 of FIG. 5, mapper 600 of FIG. 6, mapper 700 of FIG. 7, mapper 820 of FIG. 8, mapper 920 of FIG. 9, mapper 1020 of FIG. 10) and an extremum-seeking controller (e.g., controller 430 of FIG. 4, controller 830 of FIG. 8, controllers 932 and 934 of FIG. 9, controller 1030 of FIG. 10) to monitor and control a multiple-input system (e.g., system 410 of FIG. 4, system 810 of FIG. 8, system 910 of FIG. 9, system 1010 of FIG. 10).

Flow diagram 1100 is shown to include mapping a first number n of manipulated variables $x_1, x_2, \ldots x_n$ for a multiple-input system onto a second number p of latent variables $w_1, w_2, \ldots w_p$ (block 1102). The second number p is smaller than the first number n. Each of the latent variables $w_1, w_2, \ldots w_p$ is a linear combination of the manipulated variables $x_1, x_2, \ldots x_n$. The multiple-input system may include a combination of a process and one or more mechanically-controlled outputs. For example, the multiple-input system can be an air handling unit configured to control temperature within a building space via one or more mechanically-controlled actuators and/or dampers. In various embodiments, the multiple-input system can include a chiller operation process, a damper adjustment process, a mechanical cooling process, a ventilation process, a refrigeration process, or any other process in which multiple inputs to the system (i.e., manipulated variables $x_1, x_2, \ldots x_n$) are adjusted to affect one or more output from the system (i.e., performance variable y). In some embodiments, the multiple-input system is a multiple-input single-output (MISO) system. However, it should be understood that the single-output embodiment described herein is provided as an example and should not be construed as limiting. In other embodiments, the multiple-input system may have a plurality of outputs (e.g., multiple performance variables $y_1, y_2, \ldots y_m$).

The performance variable y can include, for example, power consumption by the multiple-input system, or any variable that indicates the performance of the system. A plurality of manipulated variables $x_1, x_2, \ldots x_n$ can include one or more temperatures (e.g., chilled water temperature, return water temperature, refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, fan speeds, or any other variables that can be manipulated to affect the performance variable y. There is linear relationship among at least some of the manipulated variables $x_1, x_2, \ldots x_n$.

The original n dimensional space of manipulated variables $x_1, x_2, \ldots x_n$ can be projected onto a new smaller p (p<n) dimensional space including a smaller set of p latent variables $w_1, w_2, \ldots w_p$. The latent variables $w_1, w_2, \ldots w_p$ are created from linear combinations of the manipulated variables $x_1, x_2, \ldots x_n$. In other words, at least some of the manipulated variables $x_1, x_2, \ldots x_n$ are linearly related and the latent variables $w_1, w_2, \ldots w_p$ are produced to capture the relationship. The relationship between the manipulated variables $x_1, x_2, \ldots x_n$ and the latent variables $w_1, w_2, \ldots w_p$ is described by equations (1)-(3). The number p of the latent variables can be determined using various approaches, such as principle component analysis (PCA), partial least squares (PLS), canonical correlation analysis (CCA), and so on. These approaches are discussed in detail below with reference to FIGS. 12-14.

Flow diagram 1100 is shown to include receiving the performance variable y as a feedback from the multiple-input system (block 1104) and modulating the second number p of latent variables $w_1, w_2, \ldots w_p$ to drive the performance variable y to an optimal value (block 1106). The latent variables $w_1, w_2, \ldots w_p$ are used in the extremum-seeking optimization process instead of the manipulated variables $x_1, x_2, \ldots x_n$ to optimize the performance variable y. The value of the performance variable y is optimized by driving a performance gradient y' to zero because when the gradient y' is zero, the performance variable y has an extremum value (e.g., a maximum or minimum). In some embodiments, the multivariable extremum-seeking optimization is done by a multivariable extremum-seeking controller that determines optimal values for all the latent variables $w_1, w_2, \ldots w_p$, as described with reference to FIG. 8. In other embodiments, a plurality of single-variable extremum-seeking controllers are each assigned to a different latent variable $w_1, w_2, \ldots w_p$ and configured to determine an optimal value for the assigned latent variable, as described with reference to FIG. 9. In yet other embodiments, a hybrid extremum-seeking controller is used, which operates in multiple different operating modes, as described with reference to FIG. 10.

Flow diagram 1100 is shown to include mapping the second number p of modulated latent variables $w_1, w_2, \ldots w_p$ onto the first number n of modulated variables $x_1, x_2, \ldots x_n$ (block 1108) and providing the modulated manipulated variables $x_1, x_2, \ldots x_n$ to the multiple-input system (block 1110). The latent variables $w_1, w_2, \ldots w_p$ modulated by and output from the extremum-seeking controller can be mapped back to the space of manipulated variables $x_1, x_2, \ldots x_n$ before being fed to the multiple-input system to influence the performance variable y. The conversion can be done according to equations (4)-(5).

Figure 12:
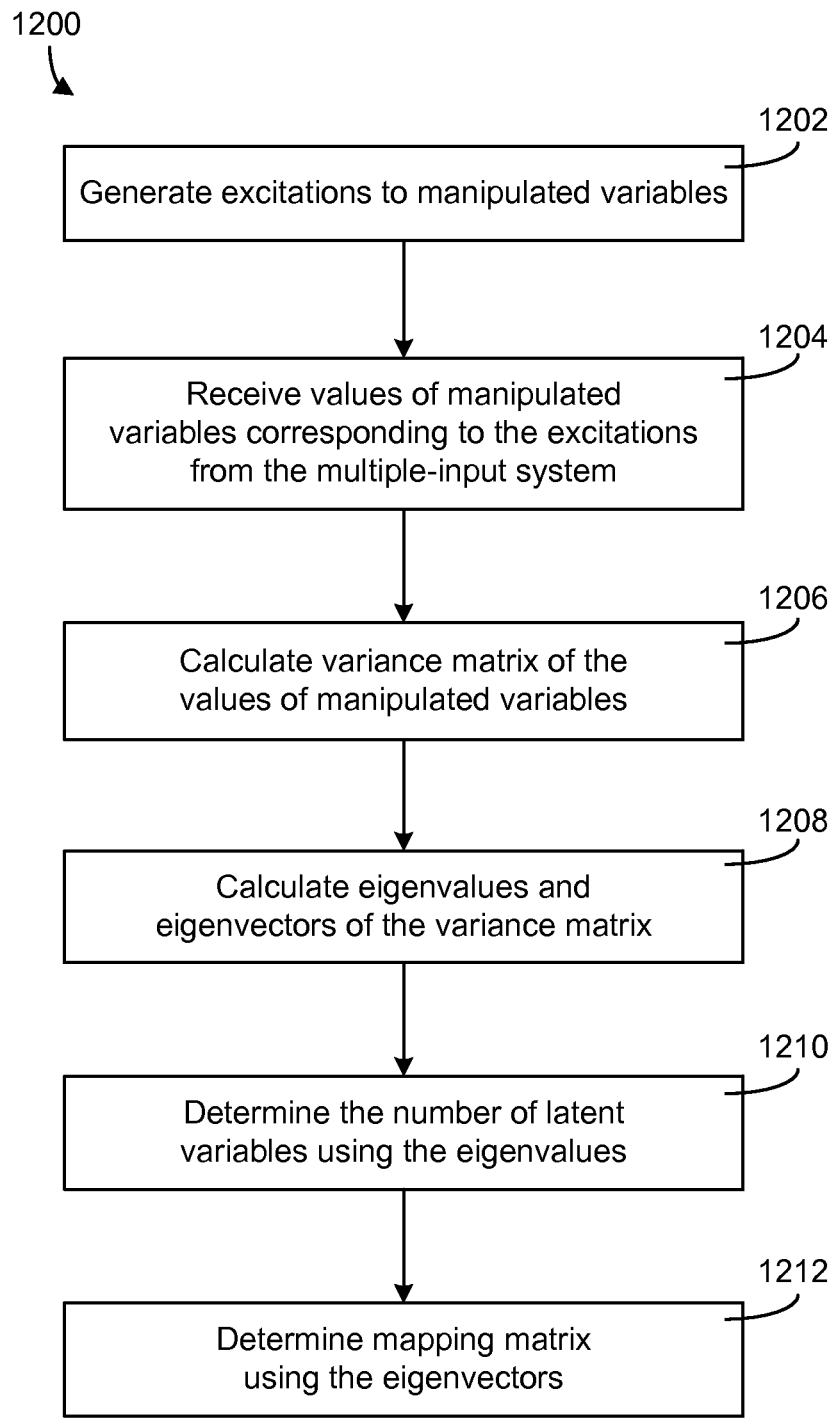
FIG. 12 is a flow diagram illustrating a method of utilizing PCA for dimension reduction, according to some embodiments.

Referring to FIG. 12, a flow diagram 1200 illustrating a method of utilizing PCA for dimension reduction is shown, according to some embodiments. The method shown in flow diagram 1200 can be used to accomplish block 1102 of flow diagram 1100 and can be performed by mapper 500 of FIG. 5.

Flow diagram 1200 is shown to include generating excitations $\Delta x_j = [\Delta x_1 \, \Delta x_2 \ldots \Delta x_n]^T$ to the manipulated variables $x = [x_1 \, x_2 \ldots x_n]^T$ (block 1202) and receiving values of the manipulated variables $x = [x_1 \, x_2 \ldots x_n]^T$ corresponding to the excitations $x_j = [\Delta x_1 \, \Delta x_2 \ldots x_n]^T$ from the multiple-input system (block 1204). The subscript j indicates that the excitation $\Delta x_j$ is the jth excitation in a series of excitations. As discussed above, the manipulated variables $x_1, x_2, \ldots x_n$ can include one or more temperatures (e.g., chilled water temperature, return water temperature, refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, fan speeds, or any other variables that can be manipulated to affect the performance variable y. Excitations to these variables can be generated by changing temperature setpoints, pressure setpoints, flow rate setpoints, valve position setpoints, fan speed setpoints, and/or the like. The manipulated variables x can be changed in the multiple-input system in response to the excitations $\Delta x_j$.

In some embodiments, an excitation (i.e., a change) to one manipulated variable is generated at a time. Values of manipulated variable(s) correlated with the excited variable may change as well. In other embodiments, excitations to more than one manipulated variables are generated at a time. However, it is possible not all the excited variables can change exactly as being excited due to correlation among the variables. It should be noted that in some embodiments, the process of generating excitations can be done separately as part of a preliminary test to identify the correlations.

Flow diagram 1200 is shown to include calculating variance matrix S of the values of the manipulated variables x (block 1206) and calculating eigenvalues $\lambda_1 > \lambda_2 > \ldots > \lambda_n$ and eigenvectors $u_1, u_2, \ldots, u_n$ of the variance matrix S (block 1208). The variance matrix S for the M excited samples of manipulated variables $x_j$ can be calculated according to equations (6)-(7). The eigenvalues $\lambda_1 > \lambda_2 > \ldots > \lambda_n$ and corresponding eigenvectors $u_1, u_2, \ldots, u_n$ of the variance matrix S can be calculated according to equation (8).

Flow diagram 1200 is shown to include determining the number p of latent variables $w_1, w_2, \ldots w_p$ using the eigenvalues $\lambda_1 > \lambda_2 > \ldots > \lambda_n$ (block 1210) and determining the dimension reduction mapping matrix A using the eigenvectors $u_1, u_2, \ldots, u_n$ (block 1212). The dimension p (p<n) of the latent variables for multivariable extremum-seeking optimization can be determined according to equation (9). The first p eigenvectors corresponding to the eigenvalues are included in the dimension reduction mapping matrix A.

Figure 13:
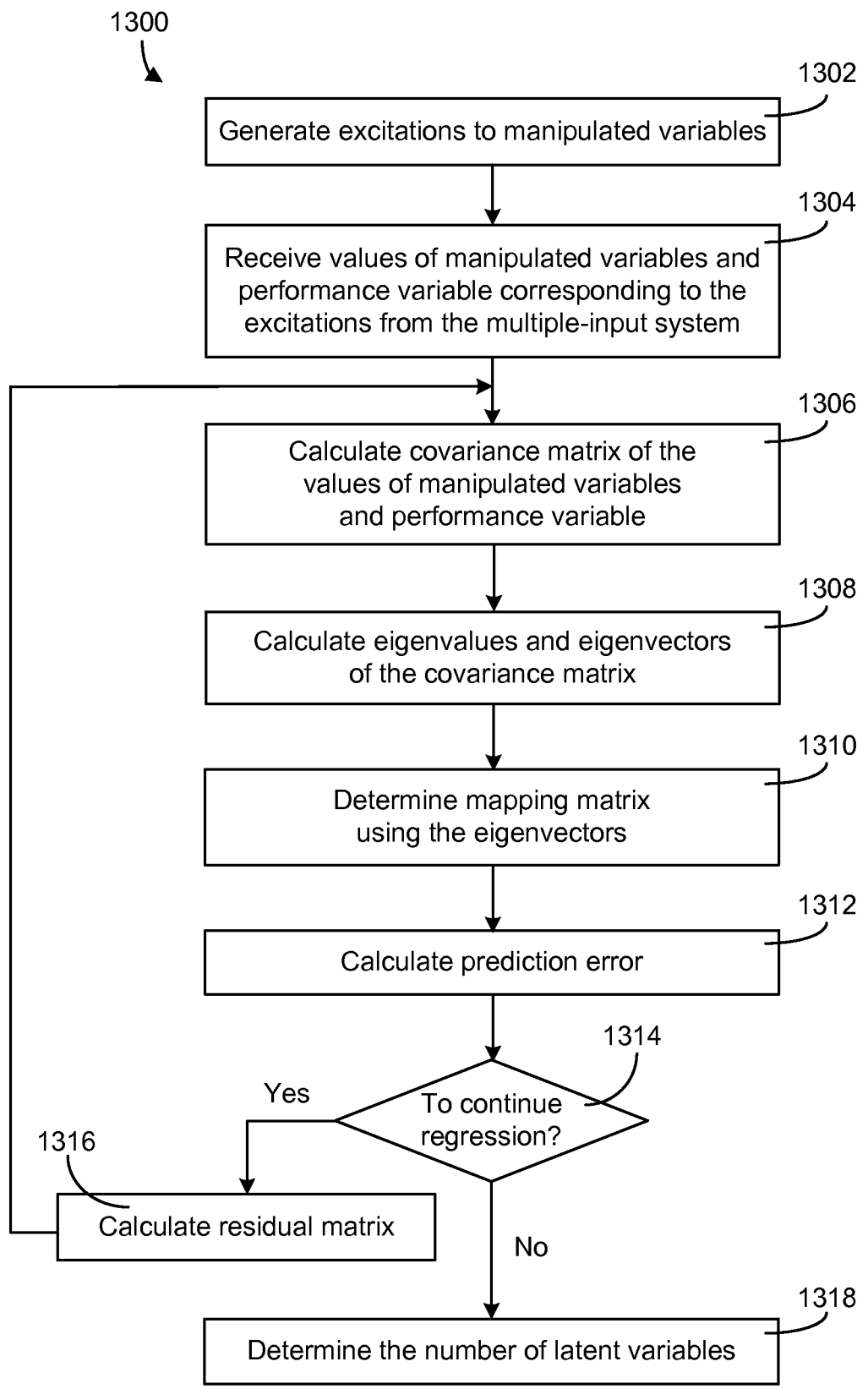
FIG. 13 is a flow diagram illustrating a method of utilizing PLS for dimension reduction, according to some embodiments.

Referring to FIG. 13, a flow diagram 1300 illustrating a method of utilizing PLS for dimension reduction is shown, according to some embodiments. The method shown in flow diagram 1300 can be used to accomplish block 1102 of flow diagram 1100 and can be performed by mapper 600 of FIG. 6.

Flow diagram 1300 is shown to include generating excitations $\Delta x_j = [\Delta x_1 \; \Delta x_2 \; \ldots \; \Delta x_n]^T$ to the manipulated variables $x = [x_1 \; x_2 \; \ldots \; x_n]^T$ (block 1302) and receiving values of the manipulated variables $x = [x_1 \; x_2 \; \ldots \; x_n]^T$ and performance variable $Y = [y_1 \; y_2 \; \ldots \; y_M]^T$ corresponding to the excitations $\Delta x_j = [\Delta x_1 \; \Delta x_2 \; \ldots \; \Delta x_n]^T$ from the multiple-input system (block 1304). In some embodiments, an excitation (i.e., a change) to one manipulated variable is generated at a time. Values of manipulated variable(s) correlated with the excited variable may change as well. In other embodiments, excitations to more than one manipulated variables are generated at a time. However, it is possible not all the excited variables can change exactly as being excited due to correlation among the variables. It should be noted that in some embodiments, the process of generating excitations can be done separately as part of a preliminary test to identify the correlations.

Flow diagram 1300 is shown to include calculating a covariance matrix $CC^T$ for M excited samples of manipulated variables $X = [x_1 \; x_2 \; \ldots \; x_M]^T$ and corresponding performance variables $Y = [y_1 \; y_2 \; \ldots \; y_M]^T$ (block 1306). The covariance matrix $CC^T$ can be calculated according to equations (11)-(12).

Flow diagram 1300 is shown to include calculating eigenvalues $\lambda_1 > \lambda_2 > \ldots > \lambda_n$ and corresponding eigenvectors $u_1, u_2, \ldots, u_n$ for covariance matrix $CC^T$ (block 1308) and determining the dimension reduction mapping matrix A using the eigenvectors (block 1310). Eigenvalues and eigenvectors satisfy equation (13). The first eigenvector $u_1$ corresponding to the first (i.e., the largest) eigenvalue $\lambda_1$ can form the first column of the dimension reduction mapping matrix A.

Flow diagram 1300 is shown to include calculating a prediction error E for the PLS regression in progress (block 1312) and determining whether to continue the PLS regression using the prediction error E (block 1314). The predication error E can be calculated according to equation (14). In determining whether to continue the regression, the predication error E can be compared with a threshold value. If the prediction error E is not greater than the threshold value, the regression is ended. If the prediction error E is greater than the threshold value, the PLS regression continues.

If it is determined to continue the regression (i.e., "Yes" at block 1314), residuals $X_{res}$ and $Y_{res}$ are calculated (block 1316) according to equations (15)-(16). The residual $X_{res}$ and $Y_{res}$ replace the original X and Y in blocks 1306-1314 and the PLS regression continues. That is, a new first $u_1$ corresponding to a new first (i.e., largest) eigenvalue $\lambda_1$ of the new covariance matrix can form the second column of the dimension reduction matrix A, and so on.

If it is determined not to continue the regression (i.e., "No" at block 1314), the number p of the latent variables is determined (block 1318), which is the number of columns in the dimension reduction matrix A.

Figure 14:
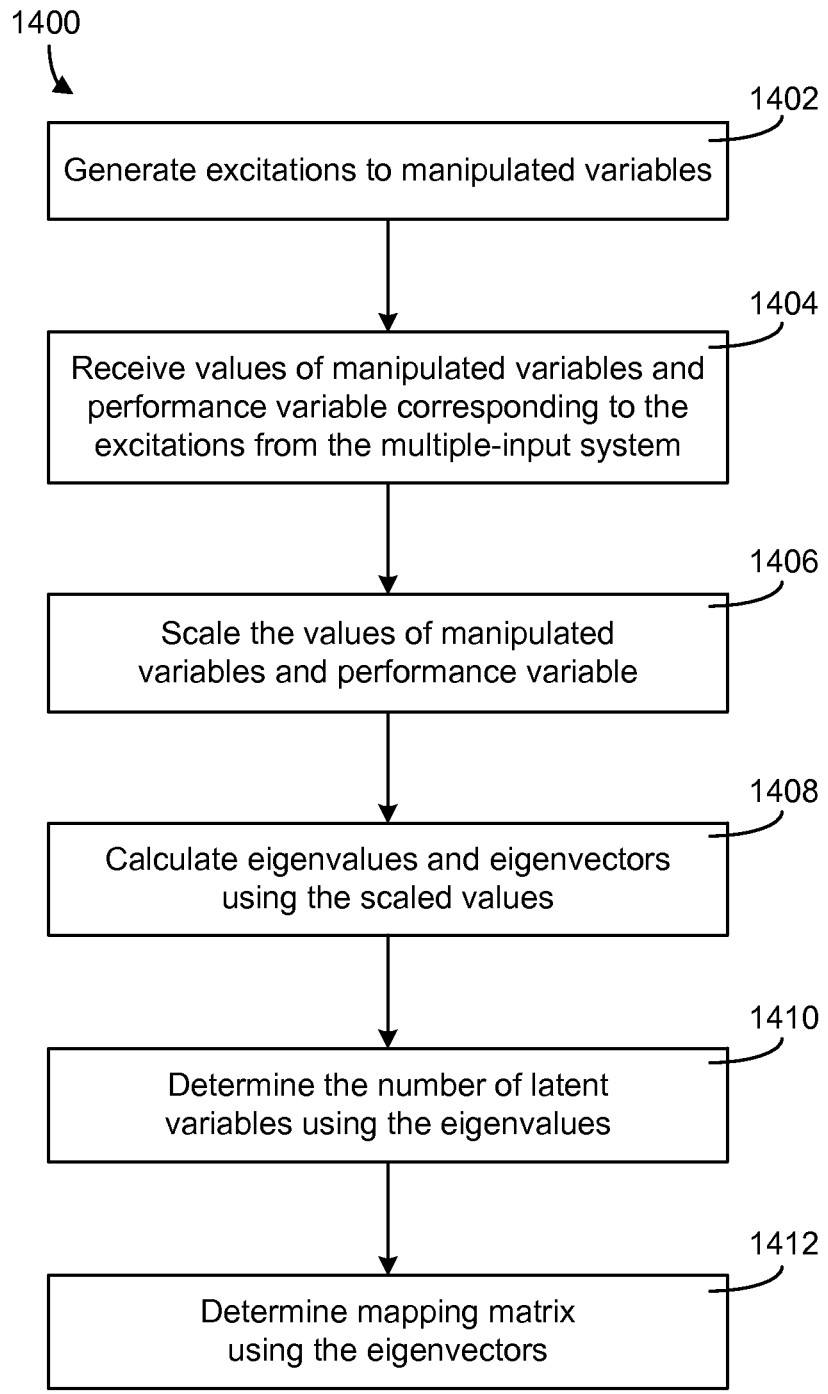
FIG. 14 is a flow diagram illustrating a method of utilizing CCA for dimension reduction, according to some embodiments.

Referring to FIG. 14, a flow diagram 1400 illustrating a method of utilizing CCA for dimension reduction is shown, according to some embodiments. The method shown in flow diagram 1400 can be used to accomplish block 1102 of flow diagram 1100 and can be performed by mapper 700 of FIG. 7.

Flow diagram 1400 is shown to include generating excitations $\Delta x_j = [\Delta x_1 \; \Delta x_2 \; \ldots \; x_n]^T$ to the manipulated variables $x = [x_1 \; x_2 \; \ldots \; x_n]^T$ (block 1402) and receiving values of the manipulated variables $x = [x_1 \; x_2 \; \ldots \; x_n]^T$ and performance variable $Y = [y_1 \; y_2 \; \ldots \; y_M]^T$ corresponding to the excitations $\Delta x_j = [\Delta x_1 \; \Delta x_2 \; \ldots \; \Delta x_n]^T$ from the multiple-input system (block 1404). In some embodiments, an excitation (i.e., a change) to one manipulated variable is generated at a time. Values of manipulated variable(s) correlated with the excited variable may change as well. In other embodiments, excitations to more than one manipulated variables are generated at a time. However, it is possible not all the excited variables can change exactly as being excited due to correlation among the variables. It should be noted that in some embodiments, the process of generating excitations can be done separately as part of a preliminary test to identify the correlations.

Flow diagram 1400 is shown to include scaling the values of the manipulated variables $x = [x_1 \; x_2 \; \ldots \; x_n]^T$ and performance variable $Y = [y_1 \; y_2 \; \ldots \; y_M]^T$ (block 1406). The original X and Y can be scaled to zero-mean matrix according to equations (17)-(21).

Flow diagram 1400 is shown to include calculating eigenvalues $\lambda_1 > \lambda_2 > \ldots > \lambda_n$ and corresponding eigenvectors $u_1, u_2, \ldots, u_n$ using the scaled matrix (block 1408). The eigenvalues $\lambda_1 > \lambda_2 > \ldots > \lambda_n$ and corresponding eigenvectors $u_1, u_2, \ldots, u_n$ satisfy equation (22).

Flow diagram 1400 is shown to include determining the number p of latent variables $w_1, w_2, \ldots w_p$ using the eigenvalues $\lambda_1 > \lambda_2 > \ldots > \lambda_n$ (block 1410) and determining the dimension reduction mapping matrix A using the eigenvectors $u_1, u_2, \ldots, u_n$ (block 1412). The dimension p (p<n) of the latent variables for multivariable extremum-seeking optimization can be determined according to equation (23). The first p eigenvectors corresponding to the eigenvalues are included in the dimension reduction mapping matrix A.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A control system for operating a multiple-input system to achieve an optimal value for a performance variable of the multiple-input system, the control system comprising:
   one or more processors; and
   one or more computer-readable storage media having instructions stored thereon that, when executed by the one or more processors, cause the one or more processors to implement operations comprising:
      generating a mapping from a first number of manipulated variables to a second number of latent variables, wherein the second number is smaller than the first number and each of the latent variables includes a linear combination of the manipulated variables;
      receiving the performance variable as a feedback signal;
      modulating values of the second number of latent variables to drive the performance variable to the optimal value;
      translating modulated values of the second number of latent variables to modulated values of the first number of manipulated variables using the mapping; and
      providing the modulated values of the first number of manipulated variables to the multiple-input system.

2. The control system of claim 1, wherein generating the mapping from the first number of manipulated variables to the second number of latent variables includes using a principle component analysis (PCA) process.

3. The control system of claim 1, wherein generating the mapping from the first number of manipulated variables to the second number of latent variables includes using a partial least squares (PLS) process.

4. The control system of claim 1, wherein generating the mapping from the first number of manipulated variables to the second number of latent variables includes using a canonical correlation analysis (CCA) process.

5. The control system of claim 1, the operations further comprising determining optimal values for all the latent variables using a multivariable extremum-seeking controller.

6. The control system of claim 1, the operations further comprising determining an optimal value for each latent variable using a plurality of single-variable extremum-seeking controllers each assigned to a different latent variable.

7. The control system of claim 1, the operations further comprising determining optimal values for the latent variables using a hybrid extremum seeking controller that operates in multiple different modes.

8. The control system of claim 1, wherein modulating values of the second number of latent variables to drive the performance variable to the optimal value comprises modulating values of the second number of latent variables to drive a gradient of the performance variable to zero.

9. The control system of claim 1, wherein modulating values of the second number of latent variables to drive the performance variable to the optimal value comprises perturbing the second number of latent variables with a periodic dither signal.

10. The control system of claim 1, wherein modulating values of the second number of latent variables to drive the performance variable to the optimal value comprises perturbing the second number of latent variables with a stochastic excitation signal.

11. A method for operating a multiple-input system to achieve an optimal value for a performance variable of the multiple-input system, the method comprising:
   generating a mapping from a first number of manipulated variables to a second number of latent variables, wherein the second number is smaller than the first number and each of the latent variables includes a linear combination of the manipulated variables;
   receiving the performance variable from the multiple-input system as a feedback signal and modulating values of the second number of latent variables to drive the performance variable to the optimal value; and using the mapping to translate modulated values of the second number of latent variables to modulated values of the first number of manipulated variables and providing the modulated values of the first number of manipulated variables to the multiple-input system.

12. The method of claim 11, wherein generating the mapping from the first number of manipulated variables to the second number of latent variables includes using a principle component analysis (PCA) process to generate the mapping.

13. The method of claim 11, wherein generating the mapping from the first number of manipulated variables to the second number of latent variables includes using a partial least squares (PLS) process to generate the mapping.

14. The method of claim 11, wherein generating the mapping from the first number of manipulated variables to the second number of latent variables includes using a canonical correlation analysis (CCA) process to generate the mapping.

15. The method of claim 11, wherein modulating values of the second number of latent variables to drive the performance variable to the optimal value includes using a multivariable extremum-seeking controller to determine optimal values for all the latent variables.

16. The method of claim 11, wherein modulating values of the second number of latent variables to drive the performance variable to the optimal value includes using a plurality of single-variable extremum-seeking controllers each assigned to a different latent variable to determine an optimal value for each latent variable.

17. The method of claim 11, wherein modulating values of the second number of latent variables to drive the performance variable to the optimal value includes using a hybrid extremum-seeking controller to operate in multiple different operating modes for determining optimal values for the latent variables.

18. The method of claim 11, wherein modulating values of the second number of latent variables to drive the performance variable to the optimal value comprises modulating values of the second number of latent variables to drive a gradient of the performance variable to zero.

19. The method of claim 11, wherein modulating values of the second number of latent variables to drive the performance variable to the optimal value comprises perturbing the second number of latent variables with a periodic dither signal.

20. The method of claim 11, wherein modulating values of the second number of latent variables to drive the performance variable to the optimal value comprises perturbing the second number of latent variables with a stochastic excitation signal.

* * * * *